US008855682B2

(12) United States Patent
Osann, Jr.

(10) Patent No.: US 8,855,682 B2
(45) Date of Patent: Oct. 7, 2014

(54) SYSTEM FOR SAFE TEXTING WHILE DRIVING

(76) Inventor: Robert Osann, Jr., Port Angeles, WA (US)

( * ) Notice: Subject to any disclaimer, the term of this patent is extended or adjusted under 35 U.S.C. 154(b) by 0 days.

(21) Appl. No.: 13/604,956

(22) Filed: Sep. 6, 2012

(65) Prior Publication Data

US 2012/0329444 A1 Dec. 27, 2012

Related U.S. Application Data

(63) Continuation-in-part of application No. 13/111,806, filed on May 19, 2011, now abandoned, which is a continuation-in-part of application No. 12/711,210, filed on Feb. 23, 2010, now Pat. No. 8,295,854.

(30) Foreign Application Priority Data

Dec. 3, 2010 (GB) .................................. 1020544.1

(51) Int. Cl.
*H04W 24/00* (2009.01)
*H04M 1/00* (2006.01)
*H04M 1/67* (2006.01)
*H04W 4/12* (2009.01)
*H04M 1/725* (2006.01)

(52) U.S. Cl.
CPC . *H04M 1/67* (2013.01); *H04W 4/12* (2013.01); *H04M 1/72552* (2013.01)
USPC ...................... 455/456.3; 455/418; 455/550.1

(58) Field of Classification Search
USPC .................... 455/456.3, 418, 550.1
See application file for complete search history.

(56) References Cited

U.S. PATENT DOCUMENTS

| | | | |
|---|---|---|---|
| 7,317,927 B2* | 1/2008 | Staton et al. | 455/456.4 |
| 7,937,125 B2 | 5/2011 | May et al. | |
| 8,145,199 B2 | 3/2012 | Tadayon et al. | |
| 8,219,146 B2 | 7/2012 | Connors et al. | |
| 8,532,667 B2* | 9/2013 | Chan et al. | 455/456.1 |
| 8,583,143 B2* | 11/2013 | Hartmaier et al. | 455/456.4 |
| 2004/0088084 A1 | 5/2004 | Geisler et al. | |
| 2006/0099940 A1* | 5/2006 | Pfleging et al. | 455/419 |
| 2009/0163243 A1* | 6/2009 | Barbera | 455/557 |
| 2010/0113073 A1 | 5/2010 | Schlesener et al. | |
| 2010/0216509 A1 | 8/2010 | Riemer et al. | |
| 2011/0034183 A1 | 2/2011 | Haag et al. | |
| 2011/0034185 A1* | 2/2011 | Hartmaier et al. | 455/456.4 |
| 2011/0039581 A1* | 2/2011 | Cai et al. | 455/456.4 |
| 2011/0117856 A1 | 5/2011 | Veluppillai et al. | |
| 2011/0143786 A1 | 6/2011 | Fan et al. | |
| 2012/0176232 A1 | 7/2012 | Bantz et al. | |

\* cited by examiner

*Primary Examiner* — Jinsong Hu
*Assistant Examiner* — William Nealon

(57) ABSTRACT

Systems and methods are described to allow safe texting with speech-text conversion for vehicle drivers, with provisions to prevent a user from defeating or bypassing the speech-text conversion. Some embodiments include a special software application in a driver's phone while other embodiments require only software changes at a service provider. If the velocity of a phone exceeds a disable threshold, it is assumed that the user may be texting while driving. That the user is a driver is then determined by one or more of multiple methods including registration. Conventional texting is then disabled for their phone and a safe texting capability is enabled instead. Where persons in the same vehicle utilize different service providers, parameters such as for instance cell phone position, velocity, and direction of travel are time stamped and passed between service providers or alternately made available to other service providers via a central database.

20 Claims, 18 Drawing Sheets

Cell Phone Use Tracking and Warning

| With D/L 1101 | With D/L | No D/L 1102 | No D/L 1103 | No D/L 1104 | Action 1105 |
|---|---|---|---|---|---|
| Text | No Text | | | | Warn |
| Text | Text | | | | No Warn |
| Text | Text | Text | | | Warn (simultaneous texting not required) |
| Text | | Text | | | Warn |
| No Text | Text | Text | | | No warn |
| No Text | Text | Text | Text | | No warn |

Figure 11

SYSTEM FOR SAFE TEXTING WHILE DRIVING

CROSS REFERENCE TO RELATED APPLICATIONS AND DOCUMENTS

This application is a Continuation-In-Part of U.S. Utility patent application Ser. No. 13/111,806 filed on May 19, 2011 now abandoned entitled "System For Tracking Text Messaging While Driving", which is a Continuation-In-Part of U.S. Utility patent application Ser. No. 12/711,210 filed Feb. 23, 2010 now U.S Pat. No. 8,295,854 entitled "System for Preventing Text Messaging While Driving", and also claims priority of and incorporates herein by reference U.S. Utility patent application Ser. No. 12/592,899 filed Dec. 4, 2009 entitled "System for Preventing Text Messaging While Driving" and British Patent Application Ser. No. GB1020544.1 filed on Dec. 3, 2010 entitled "System for Preventing Text Messaging While Driving", all of the above referenced applications commonly assigned with the present application. British Application No. GB1020544.1 has been made available to the USPTO via WIPO PDAS as of Feb. 2, 2011.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of cellular phones and cellular communications technology including text messaging, emailing, and voice communications technology, GPS technology, related computer systems and software, and vehicular transportation modalities.

BACKGROUND

It has become a widely known problem that text messaging while driving is dangerous. Recent data shows that while text messaging, a person has an impairment level twice that of a person who is legally drunk. In the US in 2008, 6,000 deaths were attributed to distraction while driving and many of these fatalities were related to text messaging. In many states it is now against the law to text message while driving. Studies show a person is 23 times more likely to crash when texting behind the wheel. As a result of these alarming statistics, governments are considering steps toward wider bans on text messaging and emailing while driving.

While banning text messaging by law is an important step towards mitigation of this problem, that alone may be insufficient. Many states have instituted hands-free laws for cell phone use, and a large percentage of the populace simply ignores these laws. While holding a cell phone to your ear reduces your ability to properly control your car, the degree of distraction afforded by text messaging or emailing while driving makes voice use of cell phones seem insignificant by comparison. Additionally, texting has become highly addictive for many people—especially younger people. This has recently been further encouraged by social networking functionalities, such that many people will compulsively persist in texting while driving regardless of the laws unless a mechanism to defeat their dangerous habit is implemented. In considering the implementation of mechanisms to defeat text messaging, a major challenge is that it is difficult to distinguish between a person driving a car or truck and a person riding in the car as a passenger or riding on public transportation. There are many positive reasons to encourage people to ride on public transportation, and it is important that steps be taken not to discourage them to do so. It is also important for similar reasons to allow people riding as passengers in a carpool situation to utilize text messaging and emails while in a moving vehicle. An effective mechanism for defeating text messaging while driving must provide individuals who habitually take public transportation or carpool with the ability to text message and email while traveling by these means. Also, to broadly enforce a ban in a shortened period of time, it is useful that any solution not require modifications to existing cell phones. The most effective short term solution would use existing cell phones and existing cellular communications hardware and be implemented solely via software at the mobile service provider. The next most effective solution would include hardware changes in the cellular infrastructure but still require no changes to cell phones. Last, easily downloaded software changes to cell phones might be acceptable under certain conditions but are not desirable.

Cell phones in use today already contain GPS location capability as part of the emergency response network. The ability to query the location of cell phone from a central location using the GPS receiver in a cell phone is useful for many purposes, and for the purposes of this invention is useful to determine both the location and the velocity of a person according to the position and speed of lateral movement of his cell phone. Position location by triangulation from multiple cell towers may be combined with GPS (AGPS or Assisted-GPS), when readings purely from a phone's GPS receiver alone are not sufficient.

Prior art inventions address the issue of allowing passengers on public transportation to text while moving by inferring that people are on such public transport by their commonality of wireless signal attributes. These solutions would require hardware changes within the service provider's infrastructure. These solutions also ignore the fact that the driver of a public transportation vehicle must be prevented from texting on his phone. Serious train and bus accidents with many lives lost have been attributed to texting by the driver/operator. Prior art inventions also do not adequately address the scenario where passengers are riding in a carpool situation as the driver would still be allowed to text unless modifications were made to both cars and cell phones. Proposed solutions to allow passengers in a car to text while moving involve some form of proximity sensor to determine that a person is not sitting in the drivers seat. Unfortunately, this requires that enhanced phones must be purchased for all such passengers and that cars be specially designed to have devices implanted at certain seat locations. Thus, this only works for new cars and trucks and also requires users to purchase new cell phones.

To implement an enforced ban on texting in a very short amount of time, it is necessary to deploy a solution that can be generally effective without requiring changes to currently deployed user phones, existing cellular hardware infrastructure, or existing vehicles. Before such a mechanism is deployed to defeat unlawful texting while driving, it may be desirable to track such illegal activity and report it to the perpetrators as warnings or in conjunction with traffic tickets. As such, a mechanism to discover and track texting while driving may be a useful interim solution. Also, it is desirable to also implement a tracking and warning mechanism without requiring changes to currently deployed user phones, existing cellular hardware infrastructure, or existing vehicles.

Some cell phone users may prefer to use a speech-to-text or text-to-speech (hereinafter: speech-text) capability in localities (cities, states, provinces, countries) where texting is illegal while driving but voice is allowed—typically requiring a hands-free capability. At the same time, if a speech-text capability is allowed, it is critical to determine that it has not been tampered with to either allow conventional manual entry of texts, or conventional viewing of textual information a user has received. Given the extremely high addiction of some people to texting, including the covert nature of manual text entry and visual text reception, it is likely that many users would seek to circumvent a speech-text capability, thereby allowing conventional texting on their phone.

SUMMARY

As described herein, the terms "texting" and "text messaging" and the verb "to text" shall also include sending and receiving emails and any form of communication via a cellular communications network that is not purely voice. Although the term "texting" often has a specific definition, for the purpose of general discussion relative to the dangers of "texting while driving" the media has chosen to frequently refer only to "texting" and thus this specification hereby adopts that terminology for those various forms of textual communication. Also, the term "driver", "operator", and "engineer" are also used interchangeably. Cars, trucks, and busses are normally said to have "drivers", however, trains are typically said to have "operators" or "engineers", hence for the purpose of the present invention, all of these terms are used synonymously. A driver of a public transportation vehicle may also be referred to as a "professional operator" or "professional driver" and it may be a requirement for some embodiments of the present invention that cell phones belonging to such persons be specially recorded as such at the cellular service provider and be treated differently from phones used by the general public. For the purposes of the present invention, a "cell phone" may be any mobile communications device capable of any form of textual communications, including PDAs and even notebook computers. A cellular "Service Provider" may at times be referred to herein as "SP". The user of a cell phone is typically referred to as "him" but actually refers to "him or her".

According to this invention the position of a person's cell phone is queried from a central location via the cellular communications link in a manner similar to that performed by the emergency response network. The position and velocity of a person's cell phone are determined. The lateral direction of travel of the person's cell phone may also be determined. These determinations may be performed by means of the comparison of successive position queries or other means, including information obtained directly from the phone if available. The fact that a person is in a moving vehicle is then determined by comparing this determined velocity with a minimum velocity threshold—the "disable threshold"—for determining disablement of texting. If sufficient position and speed information is not available from a GPS receiver in the phone at a certain point in time, the position and speed may be supplemented by triangulation of signals as referenced from multiple cellular towers, as in A-GPS or Assisted GPS, or purely by triangulation. If a person's cell phone contains internal information available to the service provider that includes any of velocity, location, or direction information, that information may also be queried by the service provider according to this invention.

One object of this invention is to prevent a person from sending or receiving text messages or emails on a cell phone while driving. To do so, the invention disables this capability for anyone riding in a moving vehicle unless he is a passenger on public transportation (bus/train), or unless the person is a passenger in a car/truck under certain conditions such as a carpool. To "disable texting", the service provider at a minimum would disable the transfer of text messages and emails from the SP to the user's phone, and also will disable the receipt of text messages and emails at the SP that are sent from the user's phone. It may be impossible to prevent the user from composing a text message or email on his phone while driving without altering the programming in the phone, and thus is not a preferred capability of this invention. However, it is possible to delay the resumption of the ability to send emails for a period of time after a person ceases to drive, such that there is little motivation to compose while driving. The user may as well wait to compose until after he stops since there would be time available then anyway. Fortunately, most text messages are relatively short, and it is text messages that have become the most addictive and are the bulk of the current hazard, especially those associated with certain popular social networking sites.

Another object of this invention is to implement a system to disable text messaging and emailing while driving without requiring any changes to the base of cellular phones currently installed, and preferably without requiring any changes to the existing cellular communications system hardware infrastructure. In the most desirable outcome, only software changes on the part of the service provider and implemented only within their infrastructure would be required to implement the key capabilities described herein. The majority of currently deployed phones contain GPS capability. For those phones not containing GPS receivers, the system according to this invention may rely solely on triangulation of signals from cellular towers. Alternately, this relatively small subset of phones may be excluded from texting and emailing capability. In most cases, these users would probably have replaced their phones in the near future anyway due to a desire for enhanced features, incompatibility with newer provider infrastructure, of simply the physical or electronic degradation of their current phone. Historically, infrastructure changes in cellular networks have, from time to time, forced users to replace their phones. Also, some older phones do not have the ability to text, email, or connect to the Internet.

Another object of the invention is to allow a person to text when his phone is within the "envelope" of a master phone. The envelope of a cell phone may include position information only and is therefore sometimes described herein as a "position envelope". The envelope of a cell phone may also include the lateral speed of the phone and/or the direction of travel of the phone. Which of these parameters is included is implementation dependent, and all combinations thereof are encompassed by the present invention. The grater the number of parameters that are included, the more computations need to be performed within the SP infrastructure and the more complicated and expensive the solution gets. An SP, potentially in concert with government authorities, may implement a simple form of the present invention and measure the results before implementing a more complicated and expensive form.

It should be noted that the envelope of a cell phone per this invention may be viewed from two perspectives. A master phone may have an envelope and other cell phones may be described as being in the envelope of the master phone. Alternately, a group of cell phones traveling together (carpool or mass transit) may be said to have an envelope. Either way, the "envelope" is meant to encompass that of the vehicle in which persons traveling together are riding as referenced from the position of a phone or phones. If a master phone is within the envelope of a group of phones, then the group of phones is also within the envelope of the master phone.

Beyond including position information, an envelope may also include cell phones maintaining the instantaneous speed of a master phone so that a person in a car/truck is prevented from riding close to a bus in order to be allowed to text. Maintaining the instantaneous speed includes the speeds of passenger cell phones tracking small speed changes that are made by the master phone. Deviations relative to how closely these speeds track each other may be compared with a "threshold of equality" to determine that a passenger cell phone user is actually riding in the same vehicle with the user of a master phone. This speed comparison may be used to determine which vehicle a passenger is actually in when his cell phone appears to be within the position envelope of multiple master phones.

The user of a master phone may utilize a different service provider than a passenger. Information parameter measurements such as cell phone position, velocity, and direction of travel may be time-stamped and then passed between service providers or alternately made available to other service providers by way of a central database. These time-stamps are useful in synchronizing information parameter measurements in order to make comparisons more meaningful.

The direction of travel may also be included as a requirement for being in the "envelope", however in actual implementation, it may not be necessary to utilize the direction of travel of a cell phone. If the position and velocity of a cell phone are to match that of a master phone over a period of time long enough to send and receive text messages, their direction of travel will in fact need to be the same. The master phone may belong to either a professional driver or to a driver of a carpool vehicle. The act of registration of a master phone is preferably performed by a voice call (preferably initiated by a single key on speed dial) or by a text message that can be sent with a minimum number of key presses (preferably one) to a special destination reserved for this purpose that is enabled for texting even when a phone is traveling faster than the disable threshold. It may also be useful if a professional driver who has registered his phone as a master phone is previously known to be a professional driver of a mass transit vehicle, and what type of vehicle he drives. Then, the length of the master phone position envelope can be computed according to the length of the vehicle. Given the inaccuracy of GPS and other location mechanisms, it is useful to compare the instantaneous velocity of phones that appear to be within the envelope of a master phone with that of the master phone in order to disable texting for cell phones in cars that are adjacent to the mass transit vehicle.

Another object of this invention is to allow a person riding on public transportation (bus/train) to be allowed to send and receive text messages or emails, while not allowing the professional driver/operator to send and receive text messages or emails while moving. This can be done by disabling texting for all phones in the vehicle until the driver registers his phone as a master phone. When the driver registers his phone as a master phone, his ability to text is disabled while users riding in the mass transit vehicle, whose phones are therefore in the envelope of the master phone, are allowed to text. If the professional driver is previously known by the SP to be a professional driver of mass transportation, he can be prompted (preferably via voice message) to register when in the presence of a group of cell phone users who are traveling in a group and at the same speed. Such a group essentially establishes their own envelope, the envelope being determined by the SP based on the position and velocity of the phones in the group. The SP then determines if the professional driver is within the envelope with the group of cell phones. The professional driver can choose to decline to register if he is at that moment riding as a passenger and not as the driver. Therefore, the registration of a cell phone belonging to a known professional driver can be purely voluntary, voluntary after being prompted, or fully automatic.

Similarly, a group of cell phone users participating in a carpool vehicle at speed may form their own envelope. Subsequently, if there is no currently registered master phone within the group and a carpool participant whose phone is within the envelope attempts to send or receive test messages, that user may be prompted that one of the group (the legal driver) should register so that the others can successfully text. Any participant in the carpool who finds his texting capability disabled can simply ask the driver to register as a master phone in order to allow the other carpool participants to text.

Similar methods are applicable to passenger and driver use of cell phones on trains. The process of establishing the position envelope for a train has unique challenges since a long train may form a curved or serpentine shape rather than the simple rectangle shape for a bus, truck, or car. On the other hand, the GPS coordinates for the railroad bed are known and may be useful in establishing a position envelope for a train.

There may exist different ways that individuals may try to bypass the system described herein and accordingly, mechanisms to discover these attempts and thwart them are also discussed herein.

Given the accuracy of position determination of a phone and therefore the accuracy for the envelope of a master phone or a group of passenger phones, the parameters for operating a system as described herein may be tuned over time with experience in order to determine the optimum parameters. Examples of these parameters include:
- the position envelope size and shape;
- the threshold of equality for the speed of a cell phone to track a master phone;
- the time delay for allowing automatic re-enablement; and
- the speed for the disable threshold.

Additionally, a functionality to track texting while driving is described and provides a useful interim solution where drivers exhibiting a high probability of texting while driving are warned of this condition. Such warnings may be delivered by various means such as for instance text messages, automated phone calls, emails, or postal letters. Warnings via text message or phone call may be deferred until such time that it has been determined via the methods contained herein that an the suspected individual is no longer in a moving vehicle. The embodiment for tracking and warning serves both as a deterrent and also prepares cell phone users for a possible ban where texting is actually disabled according to other embodiments of the present invention. As with the apparatus and methods described herein for disabling texting, the embodiment for tracking and warning may be implemented without requiring changes to currently deployed user phones, existing cellular hardware infrastructure, or existing vehicles.

Further, for municipalities where voice communication is allowed while driving, it may be desirable to allow text messages to be transferred to or from a user who may in fact be driving, when that user sends and receives those messages audibly, using a hands-free mechanism. Essentially, as long as the driver is prevented from texting with their hands and is also prevented from reading text messages visually while driving, the sending and receiving of "audible" text messages while driving can be made no more distracting than talking on the phone, and as such may be allowed. However, relying on the law to enforce this paradigm is not enough due to the addictive nature of conventional texting.

It requires a capability to prevent conventional texting, combined with audible texting, in order to create a truly safe solution.

For users who are allowed to use a speech-text capability while driving, to ensure that the user cannot circumvent the speech-text capability and utilize any aspect of conventional texting while driving, the invention described herein offers multiple solutions—one where only voice communication is allowed from a phone, and one where control for speech-text conversion is performed on the phone, but with special provisions for validation to eliminate the possibility of tampering or hacking.

BRIEF DESCRIPTION OF THE DRAWINGS

FIG. 11 shows a table describing some possible and exemplary status conditions for multiple cell phones traveling within the same vehicle, and conditions under which some cell phone users would be warned for probable texting while driving.

DETAILED DESCRIPTION OF THE INVENTION

According to the present invention, it requires a certain minimum velocity of movement of a cell phone to disable texting. This velocity should be greater than what can be achieved jogging or walking. Speeds achievable on a bicycle are probably acceptable to cause text prevention since a person texting on a bicycle at speed is a danger to traffic and himself, and because it is less likely that a person will be texting while riding a bicycle at speed.

The velocity for setting the disable threshold speed may be a specific level, for instance, 10, 12, or 15 mph. For a person to travel at more than 10 miles per hour he is either running, cycling, skateboarding, or in a motor vehicle. Texting while running at over 10 mph is probably difficult enough to be considered unnecessary. Texting while bicycling or skateboarding at over 10 mph may be considered dangerous.

Simply disabling texting for cell phones traveling in excess of a disable threshold is not acceptable because it would discourage people from utilizing mass transit and carpools when riding as passengers. Therefore, the present invention focuses on a system and methodology that provides such passengers the ability to text message while traveling at speed. This is accomplished by the service provider's system determining that an individual's cell phone traveling in excess of the disable threshold speed is within the envelope of a registered master phone. While the description provided herein focuses on system and software infrastructure provided by a mobile communications Service Provider (SP), it should be understood that the SP's system may operate in conjunction with systems and software belonging to government agencies to implement the functionalities described herein.

Figure 1:
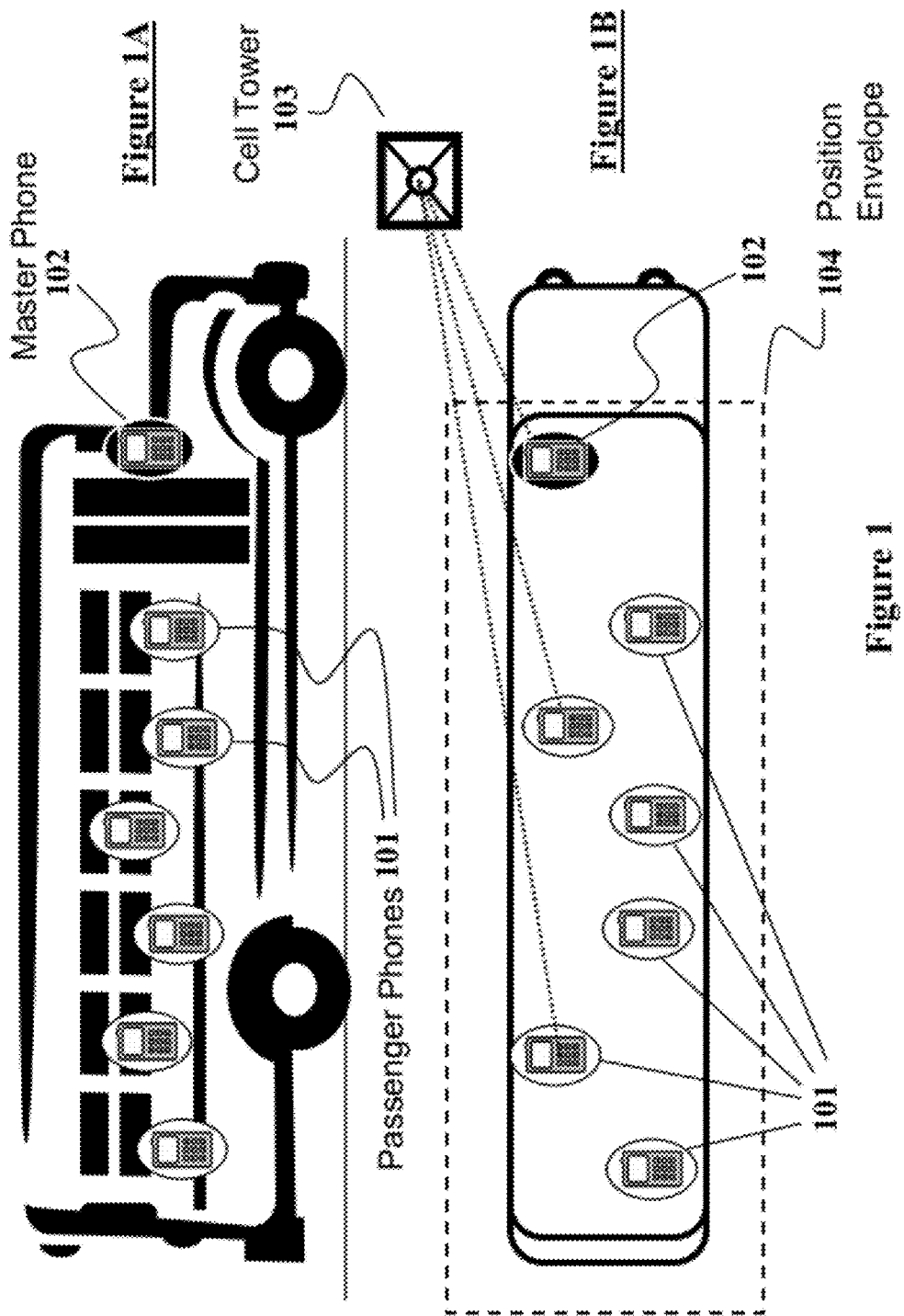
FIG. 1 shows the envelope for a bus including passenger cell phones and a registered master phone owned by a professional driver.

FIG. 1 shows the cell phones of individuals traveling on a mass transit vehicle, in this case a bus. In the cross-section diagram shown in FIG. 1A, passenger phones 101 are shown in proximity with master phone 102. The top view shown in FIG. 1B again shows passenger phones 101 and master phone 102, now in communication with cellular tower 103. Also shown is position envelope 104 which is established based on the master phone position such that passenger phones 101 are encompassed within the envelope.

Figure 2:
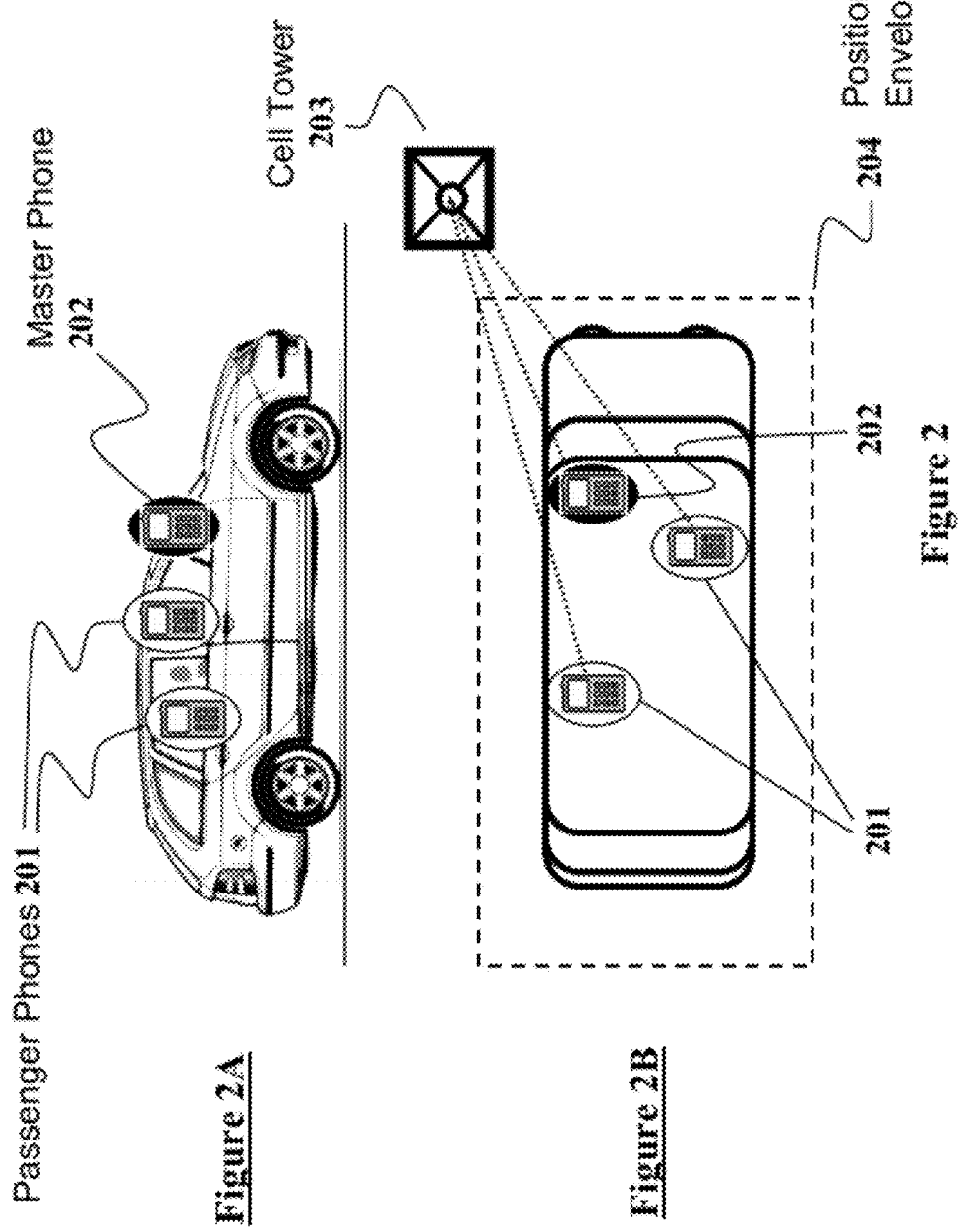
FIG. 2 shows the envelope for a car including cell phones belonging to carpool passengers and a registered master phone owned by the driver.

FIG. 2A shows a similar scenario to that of FIG. 1 except that instead of a mass transit vehicle, the vehicle is a conventional passenger car wherein at least one passenger is accompanying the driver to form a carpool. Thus per FIG. 2B, passenger phones 201 are in close proximity to master phone 202 and all phones are in communication with cell tower 203. In a similar manner to FIG. 1, a position envelope 204 is established with respect to master phone 202, that envelope encompassing passenger phones 201.

The owner of a master phone must have a valid driver's license. To better support the present invention, SPs may require that each phone in a family be assigned to a specific individual if this has not been previously done, so that a child's phone, an elderly person's phone, or any phone that belongs to person without a driver's license cannot be used to spoof a master phone. Government agencies may also correlate across cellular providers to ensure that each individual has only one cell phone assigned and active, again so as to prevent an individual from using one phone to spoof a master while texting on the other. Alternately, if an individual is allowed to have multiple phones assigned to him, the SP system may prevent texting on all such phones if any are moving in excess of a disable threshold speed while not within the envelope of a master phone.

A professional driver/operator of a public transportation vehicle may also be treated specially. The SP may maintain a database of known professional drivers, or be in communication with organizations that maintain such databases such as mass transit companies and/or government agencies that monitor and/or administrate mass transit operations. An SP may always treat the phone of a professional driver as a potential master phone, and in one embodiment the professional driver may be required to make a "request" to text while moving when he is not acting as an on-duty operator. If he is found to be texting during hours he is scheduled for duty, he may be found to be in violation of the law. Given their liability for an entire vehicle full of passengers, it is proper that professional drivers be given some form of special scrutiny.

Figure 3:
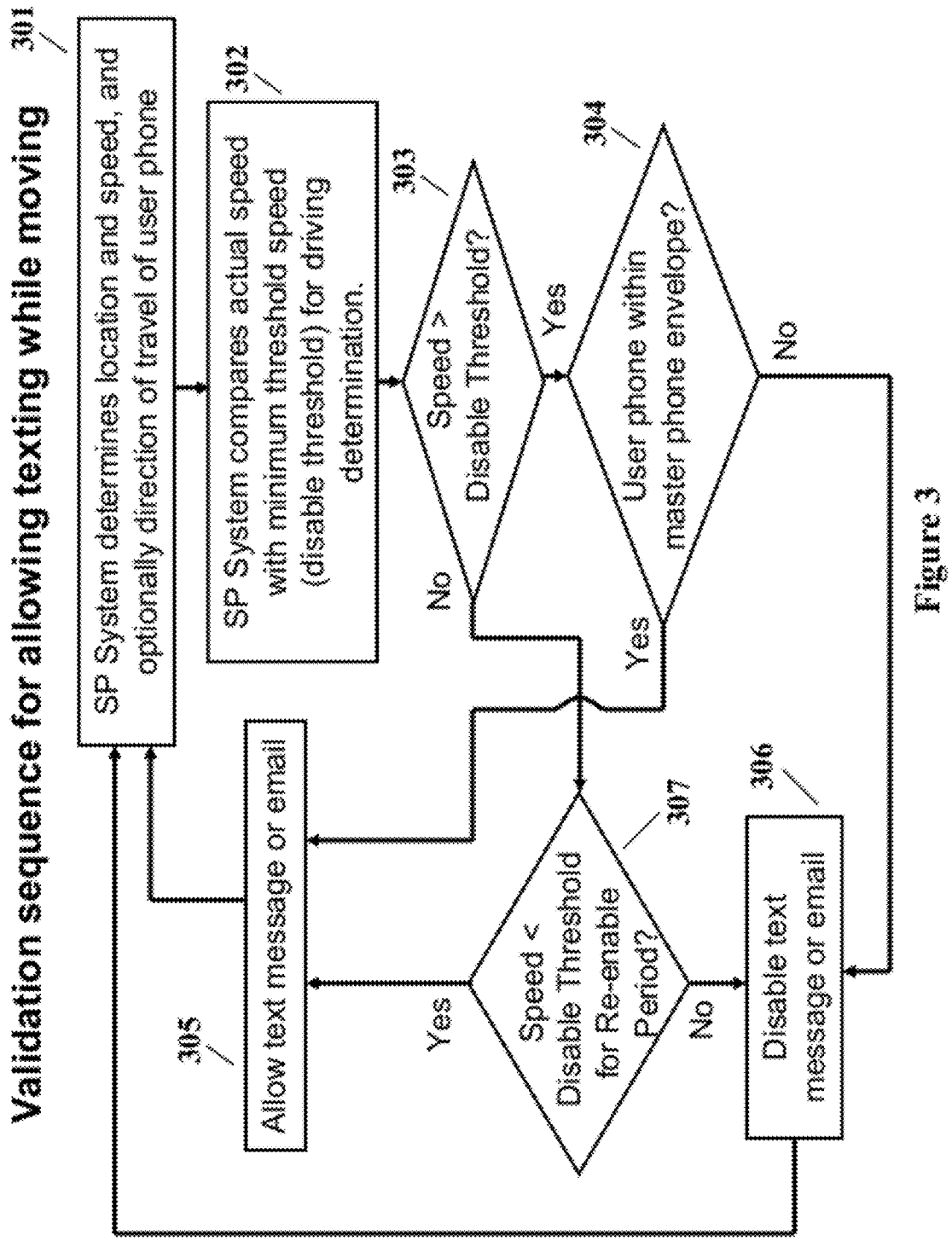
FIG. 3 shows the validation sequence whereby a service provider will prevent the driver of a vehicle from texting while allowing passengers to text.

FIG. 3 shows a possible validation sequence for allowing texting on a moving cell phone according to the present invention when that cell phone is within the envelope of a master phone. In step 301, the SP system determines the location and speed of a cell phone and may optionally also determine the direction of travel of the phone. Then, in step 302 the SP system compares the determined speed of the cell phone with a minimum threshold (the disable threshold speed) in order to determine if the phone is moving fast enough to be considered a danger for texting. According to step 303, if the cell phone's speed is greater than the disable threshold, a determination according to step 304 will be made to decide if the cell phone is within the envelope of a master phone. If the speed of the cell phone exceeds the disable threshold and is not within a master phone envelope, then according to step 306 texting will be disabled for that cell phone. If however, the cell phone is within a master phone envelope, then according to step 305 texting will be allowed for that individual's cell phone. If the system determines that according to step 303 the speed of the cell phone is less than the disable threshold, then according to step 307 a determination will be made to decide if the cell phone speed has been less than the disable threshold for a period of time—the "re-enable period". Only if the cell phone speed has been less than the disable threshold for a period of time equal to the re-enable period, will the user of that cell phone once again be allowed to text.

When a person's phone stops moving, or drops below the disable threshold for a certain amount of time, it is assumed that the vehicle is no longer moving or is no longer in stop-and-go traffic, and his phone is re-enabled for texting. This re-enable period may be chosen to be sufficiently longer than the longest traffic signal cycle time, or by other means. It may be set by varying the re-enable delay and measuring the results. For instance, if a text message is sent immediately after the re-enable period expires and the length of the message is such that it could not have been composed by a typical user within the re-enable period, that is a clue that the re-enable period may not be long enough. The time delay for the re-enable period provides extra minutes of time to compose a text message after completing a period of driving, rather than trying to compose a message while driving. To ensure that a driver is not simply caught in stop and go traffic whereby a cessation of motion is simply temporary, the re-enable period must be of sufficient length. Regarding the stop and go scenario, were it not for the re-enable period that prevents sending messages after stopping, some drivers addicted to text messaging would compose their messages while moving and send them while stopped during the cyclical pattern of stop and go driving.

Figure 4:
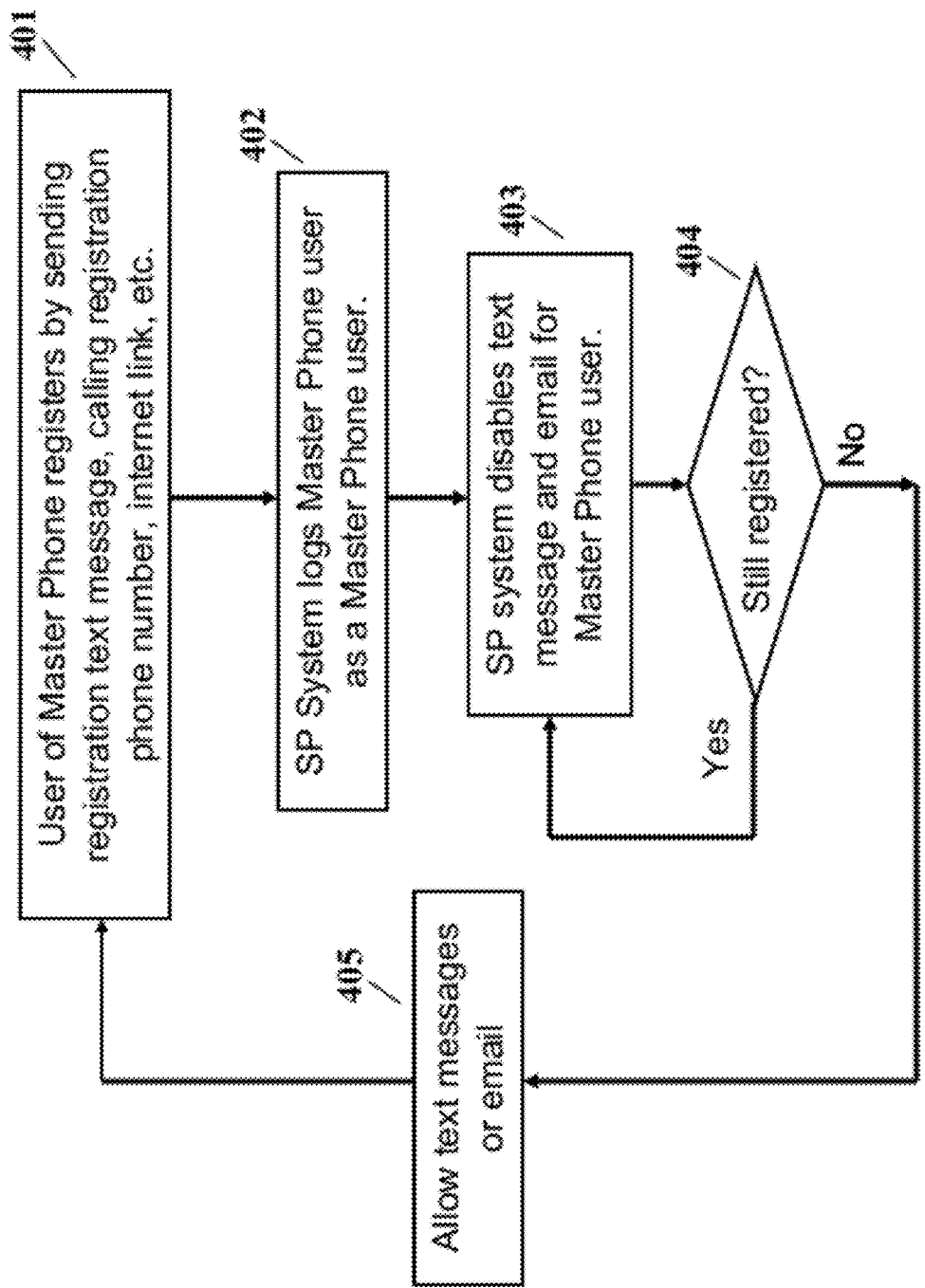
FIG. 4 shows the process of registration of a master phone.

A registration sequence for a master phone according to the present invention is shown in FIG. 4. Here, in step 401 the user of a master phone registers by a communication with the SP. This communication may take a number of forms such as for example a text message, calling a registration phone number, or an Internet link. It is important that the act of registration does not distract the driver any more than necessary. Therefore it would be useful for a driver who frequently registers to assign the registration phone number to a speed dial number, or to create a standard text message that can be sent with the press of a single key, preferably to a special destination set up by the SP and reserved for this purpose that is enabled for texting even when a phone is traveling faster than the disable threshold. Also, the SP may create a short number sequence that when dialed automatically registers a phone as a master phone. In step 402 the SP system logs the master phone user as the current active user of a master phone. Then, in step 403 and 404, the SP system will disable texting for the master phone user as long as he is still registered. When he is no longer registered according to step 404, he may be allowed to resume text messaging per step 405 as long as a re-enable time period has passed.

Alternately, it is possible to install a cell phone or equivalent functionality in a mass transit vehicle to act as a form of permanent master phone. This is one solution to the problem that occurs when the operator forgets to register as a master phone, thus leaving his passengers without the ability to text. However, this still leaves the problem that the operator's personal cell phone must be disabled while moving. Assuming that the service provider is made aware of the cell phones of all professional mass transit drivers, these phones can be disabled when moving. Unfortunately, that prevents a professional driver from texting when traveling on mass transit as a passenger. Thus, the best overall solution may be for the actual operator of a mass transit vehicle to be required to register his phone as a master phone, thereby allowing a different professional driver to text on a mass transit vehicle when off duty and riding as a passenger.

De-registration of a master phone may occur in a number of ways. The driver may be offered the following choices for example:
1) auto-deregistration (x minutes of slow or stopped motion, equal to or longer than the re-enable period).
2) manual deregistration—stay registered until operator deregisters.
3) registration for a fixed time (one shift for a professional driver).

Note that having multiple active master phones on a vehicle could enable the driver to de-register and text. People who drive in carpools as registered master phone user and then park and get on public transport can compound this problem if their phones don't de-register automatically. Thus, it may be preferred to have automatic de-registration after the re-enable period has transpired. Still, the following sequence of events demonstrates one scenario that could arise even with automatic de-registration after a re-enable period:

1. The cell phone of a non-professional driver is currently registered as a master phone;
2. For a period of time less than the re-enable period, the speed of his phone has been less than the disable threshold; and
3. His phone is then determined to be within the envelope of a master phone registered to a professional driver of a mass transit vehicle.

Upon detecting this situation, the cell phone of the nonprofessional driver can be automatically de-registered to avoid the situation where two master phones are present on the mass transit vehicle. Regardless, it may be beneficial for the SP system to determine if multiple master phones are active on the same mass transit vehicle and take steps to remedy the situation. A general way to handle this scenario is that if registered master phones of a non-professional driver and a professional driver are within the same envelope, the phone of the non-professional driver is automatically de-registered and allowed to text at speed.

Figure 5:
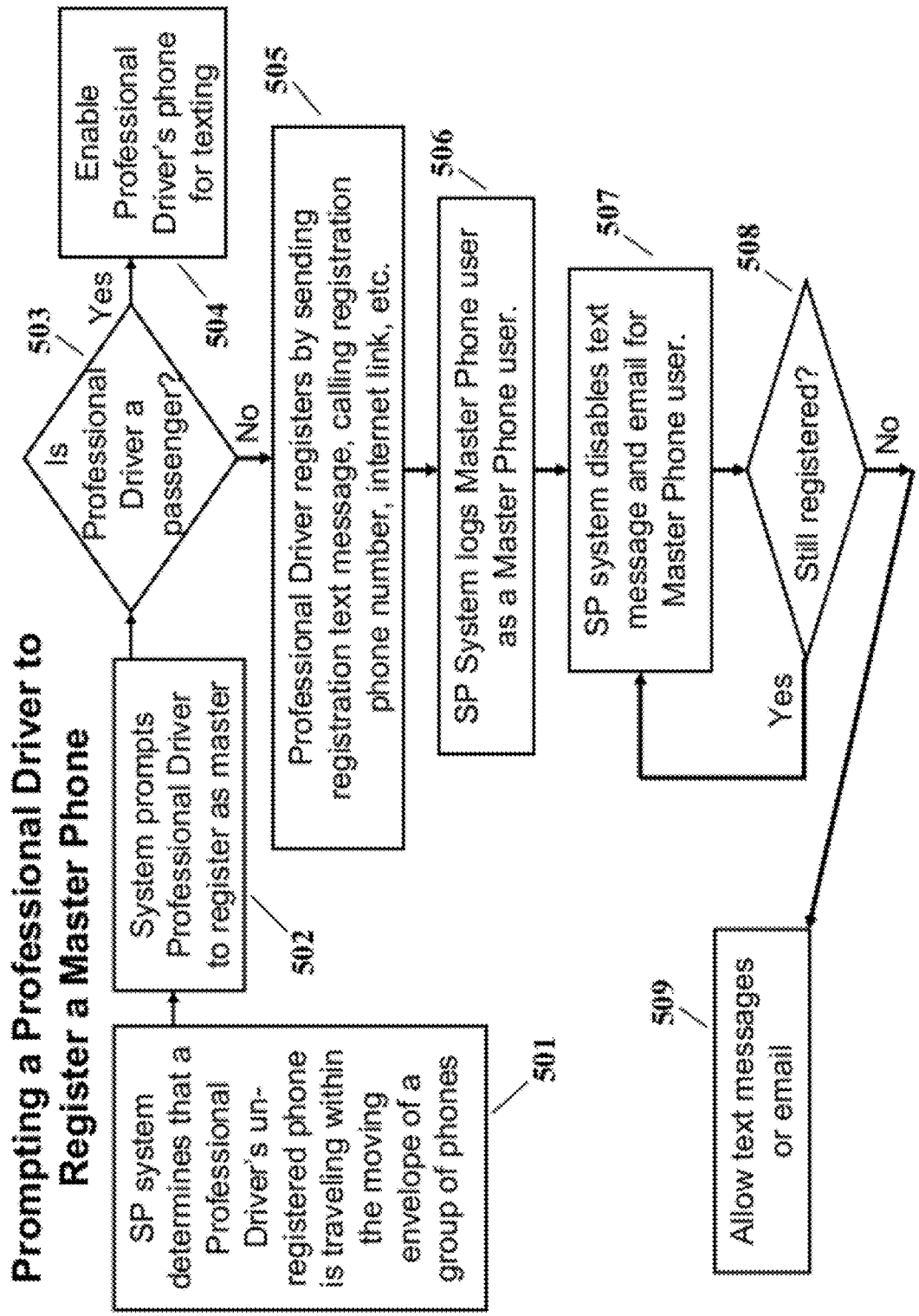
FIG. 5 shows the process whereby the SP system determines that an un-registered professional operator is traveling within the moving envelope of a group of phones, and the professional operator is prompted to register as a master phone user.

For several embodiments of the present invention, a mass transit driver must register his phone in order for his passenger's phones to text. If he forgets to register, his passengers will be annoyed when attempting to text. In order to avoid unhappy passengers, a driver can also be known to the SP system as a professional driver, and then when his phone is in the presence of a group of people with the same position and speed as the professional driver, the professional driver can be prompted to register. Essentially, a group of cell phone users riding as passengers may form their own envelope and a professional driver whose phone is also in that envelope may be prompted to register in order to enable the passengers to text. This registration could also be done automatically, but that could disable the driver in some scenarios when he is on a bus as a passenger. An example process for prompting a professional driver to register his phone as a master phone is shown in FIG. 5. In step 501, the SP system determines that a professional driver whose cell phone is currently not registered as a master phone is traveling within the envelope of a group of cell phones. In step 502 the system then prompts the professional driver to register his phone as a master phone. In the interest of safety, this prompt should occur in a manner with minimal distraction of the professional driver in case he should currently be operating the vehicle. In step 503 a determination is made by the professional driver as to whether he is the operator of the vehicle or a passenger. If he is a passenger, his phone will be enabled for texting according to step 504. If however, he is the operator of the vehicle, he would register his cell phone according to step 505 as a master phone, and would be logged at the SP system as a master phone user and the active operator of the vehicle. Subsequently, in step 507 the SP system will disable texting for the professional driver. In step 508 upon deregistration of the professional driver's phone to be no longer a master phone, he would be allowed to text according to step 509 after a re-enable period of time has passed.

Figure 6:
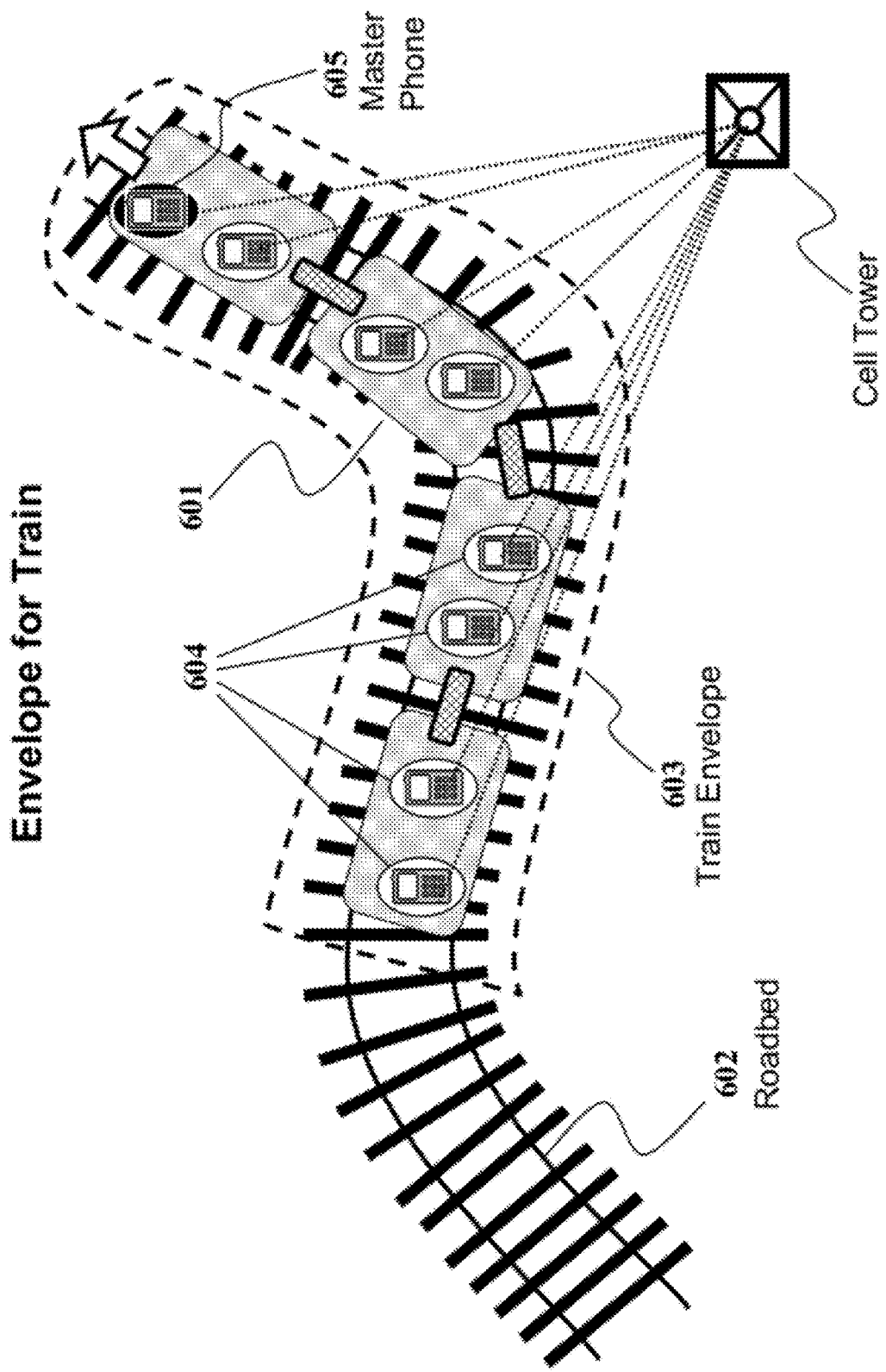
FIG. 6 shows a train on a railroad bed where passengers are allowed to text on their cell phones and the operator of the train is not.

Trains have unique problems as described for FIG. 6. They also have restrictions that simplify these problems. A long train 601 can travel on a railroad bed 602 that curves substantially, so the envelope 603 for a train of any substantial length is unusually shaped and difficult to associate with a passenger's cell phone 604 based simply on following a master phone 605. At the same time, the roadbed is known and each increment of a railroad bed has a very specific GPS location. For (long) trains, it may be better to determine the locations of passengers' cell phones based on roadbed coordinates and deal with the operator of the train by another means—for instance automatic registration of an operator's phone when on a roadbed that causes automatic disablement of texting for his phone. Alternately, a professional operator's phone can remind him when on a roadbed that he should register it as a master phone, and if he is a passenger and not the active operator, he can signal via his phone that he is a passenger and to not remind him further for the duration of the trip. For a professional operator to successfully indicate that he is a passenger, there must be another phone on the same train belonging to the active operator and currently registered as a master phone. For trains, the delay that a train must be below the minimum disabling speed before texting is re-enabled may be different than for cars, trucks, and busses, and is most probably set according to the maximum time that a train is typically stopped at a station. A very short train (cable car, or a light rail) may be treated like a bus or alternately like a train.

A goal of the present invention is to be as effective as possible in preventing drivers and operators of motor vehicles from texting while in motion. At the same time, another goal of the present invention is to accomplish this with an implementation strategy that can be executed quickly and using existing equipment wherever possible. While the system as described herein may accomplish this goal with a high degree of success, there may still be individuals who attempt to circumvent the system. For instance, a solitary driver may find a way to carry two phones such that one can be registered as a master phone while the other is used for texting. Such an attempt at circumvention can be detected by the SP system for example by:

1) Determining that a driver frequently has a second phone active in his car and it always comprises the same phone. Working in conjunction with government authorities, the user assigned to each phone may be contacted and validated;
2) Determining that a driver frequently has a second phone in his car yet rarely uses the carpool lane. Working in conjunction with government authorities, the user assigned to each phone may be contacted and validated; or
3) Determining that a registered driver frequently has a passenger's phone directly to his left or in front of him, but within the same envelope.

Multiple Service Provider Scenarios

Figure 7:
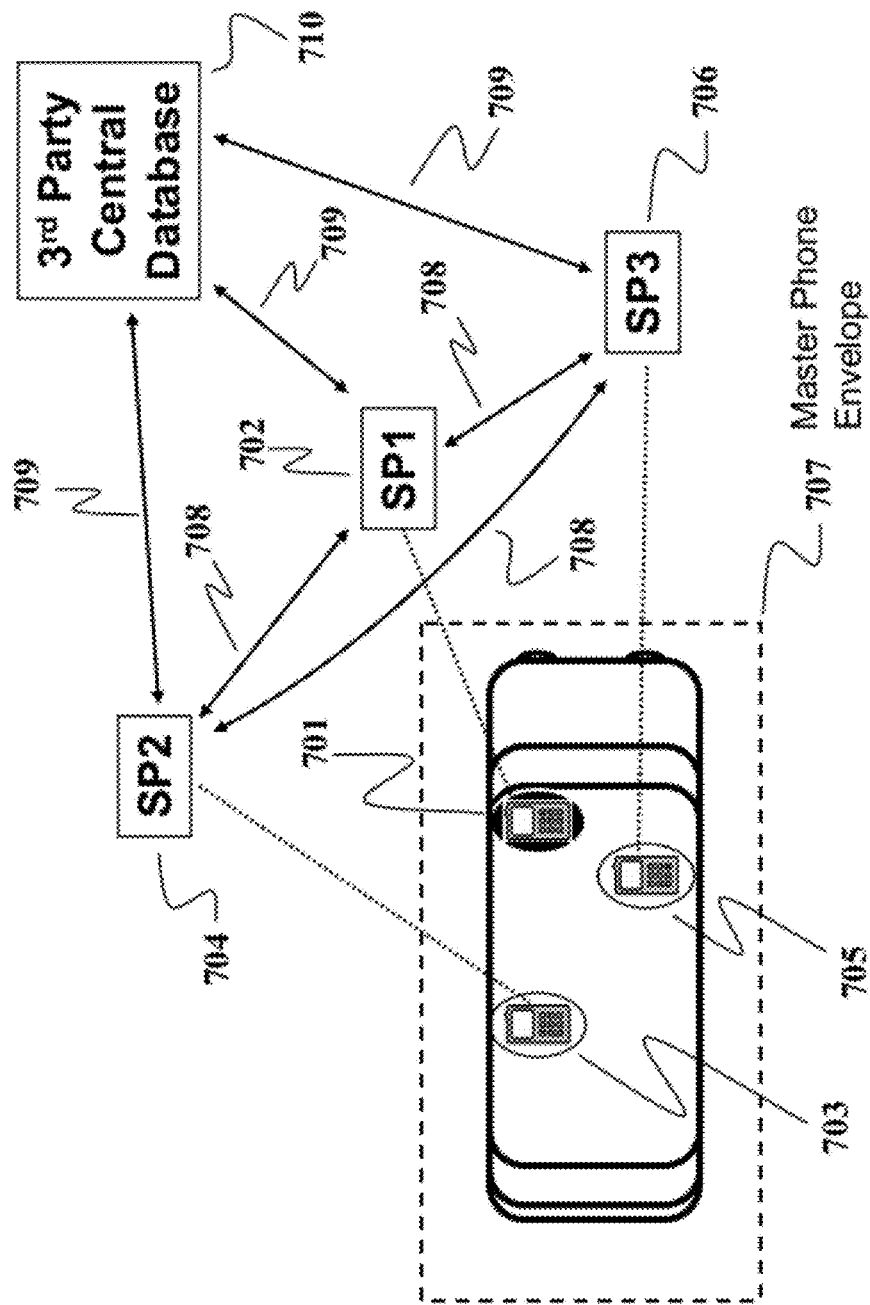
FIG. 7 shows multiple cell phones traveling within the same vehicle where each cell phone is serviced by a different service provider.

While it will often occur that all persons traveling in the same vehicle have cell phones serviced by the same service provider such as in the case of a family, it will of course also occur that some people riding in a vehicle will have different service providers from others in the same vehicle. When this occurs, the system heretofore described for the present invention will function properly as long as appropriate communications exist between multiple service providers. To clarify how such communications might operate, consider the multiple service provider scenario of FIG. 7 where three individuals have cell phones 701, 703, and 705, each serviced by a different service provider. Phone 701 is serviced by provider 702, phone 703 by provider 704, and phone 705 by provider 706. In this example, the user of phone 701 has registered that phone is a master phone with provider 702. Each service provider keeps track of any or all of position, velocity, and direction parameters for cell phones it services. When the velocity of a phone such as 703 or 705 exceeds the disable threshold, the associated service provider must determine if that phone is within the envelope 707 of a master phone in order to make the decision to enable or disable texting for that phone. Thus, envelope information for master phones must be made available to all participating service providers. This information may be transferred between service providers directly via communication links such as link 708. Alternately, this information may be transferred from the originating service provider to a third party 710 or central database repository of some kind where the information is then made available to any participating service provider by accessing the central database via communication links such as links 709. The central database could be maintained by a third party co-op organization operated by participating service providers, or by an independent third party. An independent third party could be operated as an independent organization or alternately under the auspices of a government agency—for instance the NHTSA (National Highway Traffic Safety Administration).

When a first service provider registers a cell phone as a master phone and subsequently tracks and records information parameters concerning the master phone such as position, velocity, and direction of travel, it is also useful to record a specific point in time for each parameter measurement with a time marker or time stamp. When this time marker is supplied along with the corresponding master phone envelope information to a second service provider, the time markers allow the second service provider to synchronize or correlate the behavior of a particular cell phone with that of master phones in its vicinity—making meaningful parameter comparisons for similar points in time. Due to system inaccuracies and delays, as well as the interval spacing for taking parameter measurements for a particular phone, there may not exist time markers that match exactly. However, as long as the time markers match within an acceptable threshold of equality, the validity of the overall methodology is maintained.

Figure 8:
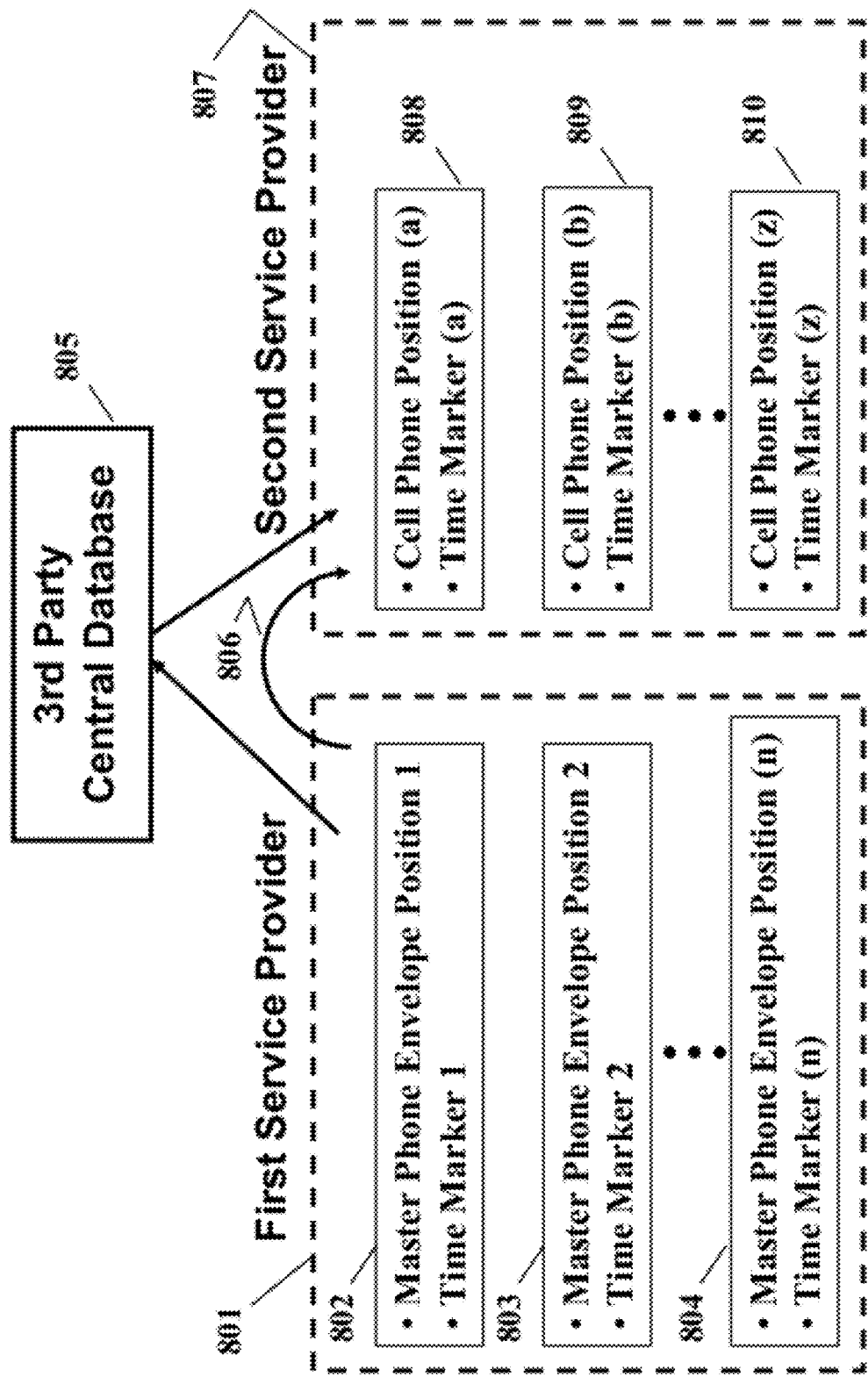
FIG. 8 shows an information flow graph for passing parameter data and time markers between service providers to enable the required analysis according to the present invention.

An information flow for passing parameter data and time markers between service providers to enable the required analysis is demonstrated graphically in FIG. 8. Here, a first service provider records master phone envelope information 801 at different points in time that may include for instance position information such as that recorded at time marker 1 (802), time marker 2 (803), and time marker (n) 804. This information is then made available to a second service provider by way of a third-party 805 or directly via communications link 806. Meanwhile, the second service provider has been maintaining information parameters 807 concerning a cell phone it services, and when that cell phone has been observed to travel at a velocity greater than a disable threshold, various parameters for that phone are tracked by the second service provider along with time marker information for each measured parameter. The second service provider might maintain for instance position information at time marker (a) 808, time marker (b) 809, and time market (z) 810. Subsequently, the second service provider might determined that the time value of time marker (b) is within a threshold of equivalence to the time value of time marker 1 for the information 801 supplied by the first service provider for a master phone. With this timing synchronization having been made, the second service provider can then determine if the position of the cell phone is within the position envelope of the master phone at this specific point in time. Other parameter comparisons such as the velocity and direction of travel of the phone in question compared with that of various master phones may be made as appropriate, with an overall determination eventually made by the second service provider to enable or disable texting for the particular cell phone if it is determined to not be in the envelope of a master phone. Because the position accuracy of GPS and other cell phone position location means varies with location and other conditions, it may be important to bring other parameters into the determination—in particular velocity. If the position envelope of a master phone in a particular circumstance is wide enough to encompass drivers of adjacent vehicles, the probability that an adjacent vehicle with have a velocity that precisely tracks that of the master phone is unlikely. Thus, including instantaneous velocity in the determination of the master phone envelope is very useful, and marking such parameter measurements with time-stamps is useful to align the parameters in time.

Cell phone base stations typically contain GPS receivers that access time information supplied by the atomic clocks in the GPS satellites. This precise time information enables time stamping or marking of events observed at the base station with the degree of accuracy required to accurately perform parameter comparisons for multiple cell phones.

According to Wikipedia.org:

"Since the advent of the Global Positioning System, highly precise, yet affordable timing is available from many commercial GPS receivers. Its initial system design expected general timing precision better than 340 nanoseconds using low-grade "coarse mode" and 200 ns in precision mode. A GPS receiver functions by precisely measuring the transit time of signals received from several satellites. These distances combined geometrically with precise orbital information identify the location of the receiver. Precise timing is fundamental to an accurate GPS location. The time from an atomic clock on board each satellite is encoded into the radio signal; the receiver determines how much later it received the signal than it was sent. To do this, a local clock is corrected to the GPS atomic clock time by solving for three dimensions and time based on four or more satellite signals. Improvements in algorithms lead many modern low cost GPS receivers to achieve better than 10 meter accuracy, which implies a timing accuracy of about 30 ns. GPS-based laboratory time references routinely achieve 10 ns precision."

When comparing parameter data, or time-stamps associated with parameter data, different values may often be close enough to equal to be considered equal from a practical standpoint without actually being equally when viewed with a higher degree of precision. Thus for the present invention, it may often be required that two parameters be equal within a "threshold of equality". This essentially means that there is a tolerance on judging the equality of parameter values and that this tolerance may vary depending on the needs of a particular implementation.

Figure 9:
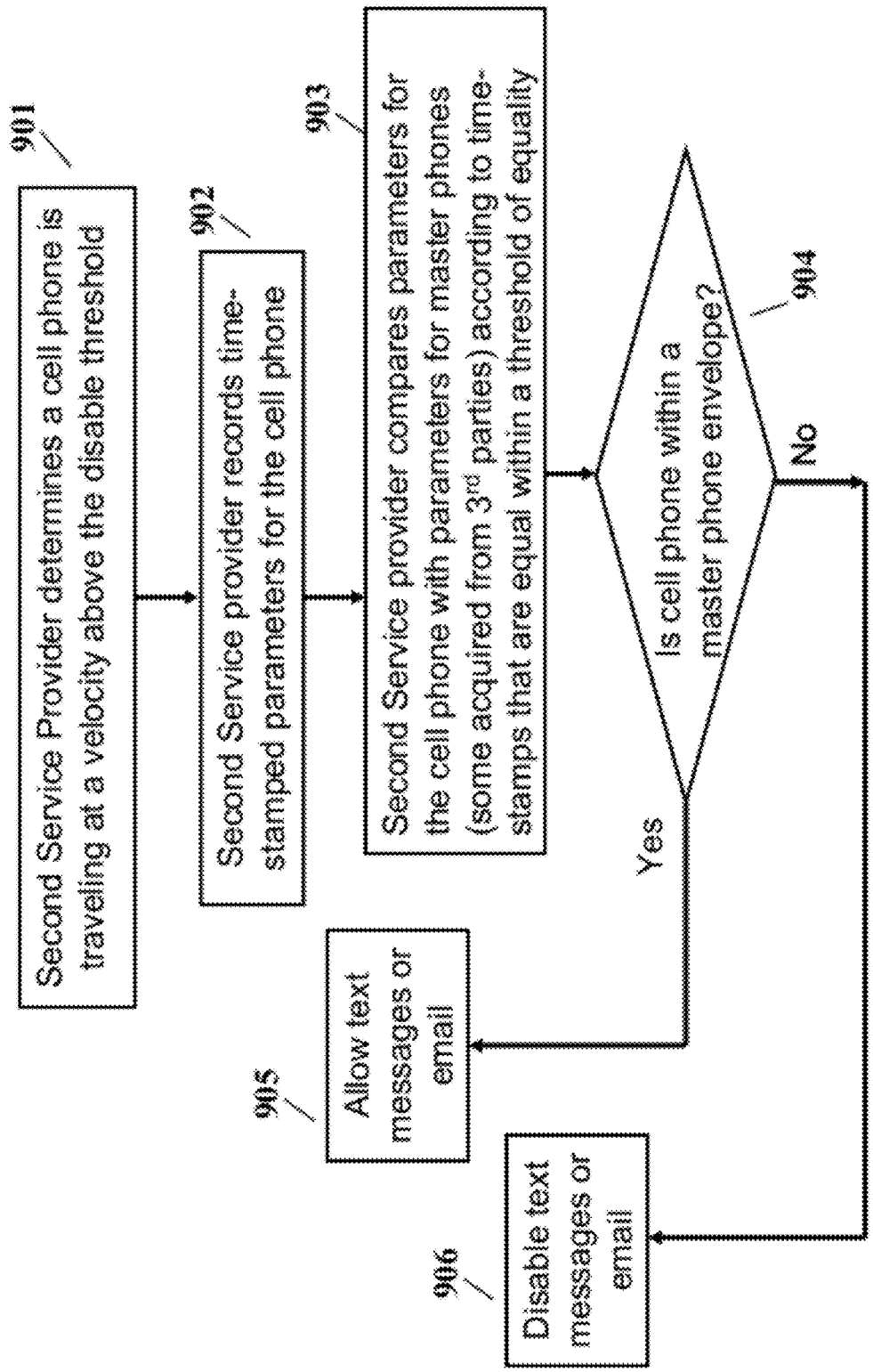
FIG. 9 shows a method for operation of the FIG. 8 embodiment to determine texting enablement when multiple service providers are involved.

The method for the FIG. 8 embodiment to determine texting enablement when multiple service providers are involved is shown in FIG. 9. Here, the second service provider observes at regular intervals the velocities of it's customer's cell phones and occasionally determines that a particular phone is traveling 901 at a velocity in excess of a disable threshold. The second service provider then records 902 (or continues to record) time-stamped parameters (parameters with time-markers that mark the instance in time of the parameter measurement) such as any or all of position, velocity, and direction of travel.

The second service provider then compares 903 parameters for the cell phone with parameters for master phones in the vicinity—some parameters acquired externally such as from the first service provider or a general $3^{rd}$ party database, and some registered and tracked by the second service provider itself—according to time-stamps that are equal within a threshold of equality. By lining up these parameter measurements in time, a valid comparison and determination can be made to determine 904 if the phone in question is within the envelope of a master phone. If it is, then the second service provider will allow 905 text messages. If the second service provider determines that the cell phone is not within a master phone envelope, then text messaging will be disabled 906 for that phone until it's velocity has dropped below the disable threshold for a pre-determined period of time.

For multiple service provider scenarios such as those of FIGS. 8 and 9, each service provider will typically watch multiple registered master phones and thus be considered at times the "first service provider". At the same time, each service provider will also watch multiple cell phones that are not so registered, thereby functioning at times as the "second service provider" relative to those un-registered phones. When both a master phone and a non-master phone are serviced by the same provider, that service provider may function as both the first and second service providers.

Tracking and Warning of Probable Texting while Driving

A functionality for tracking texting while driving according to the present invention provides a useful interim solution where drivers exhibiting a high probability of texting while driving are warned of this condition. This embodiment for tracking and warning serves both as a deterrent and also prepares cell phone users for a possible ban where texting is actually disabled according to other embodiments of the present invention. As with the apparatus and methods described herein for disabling texting, the embodiment for tracking and warning may be implemented without requiring changes to currently deployed user phones, existing cellular hardware infrastructure, or existing vehicles.

Figure 10:
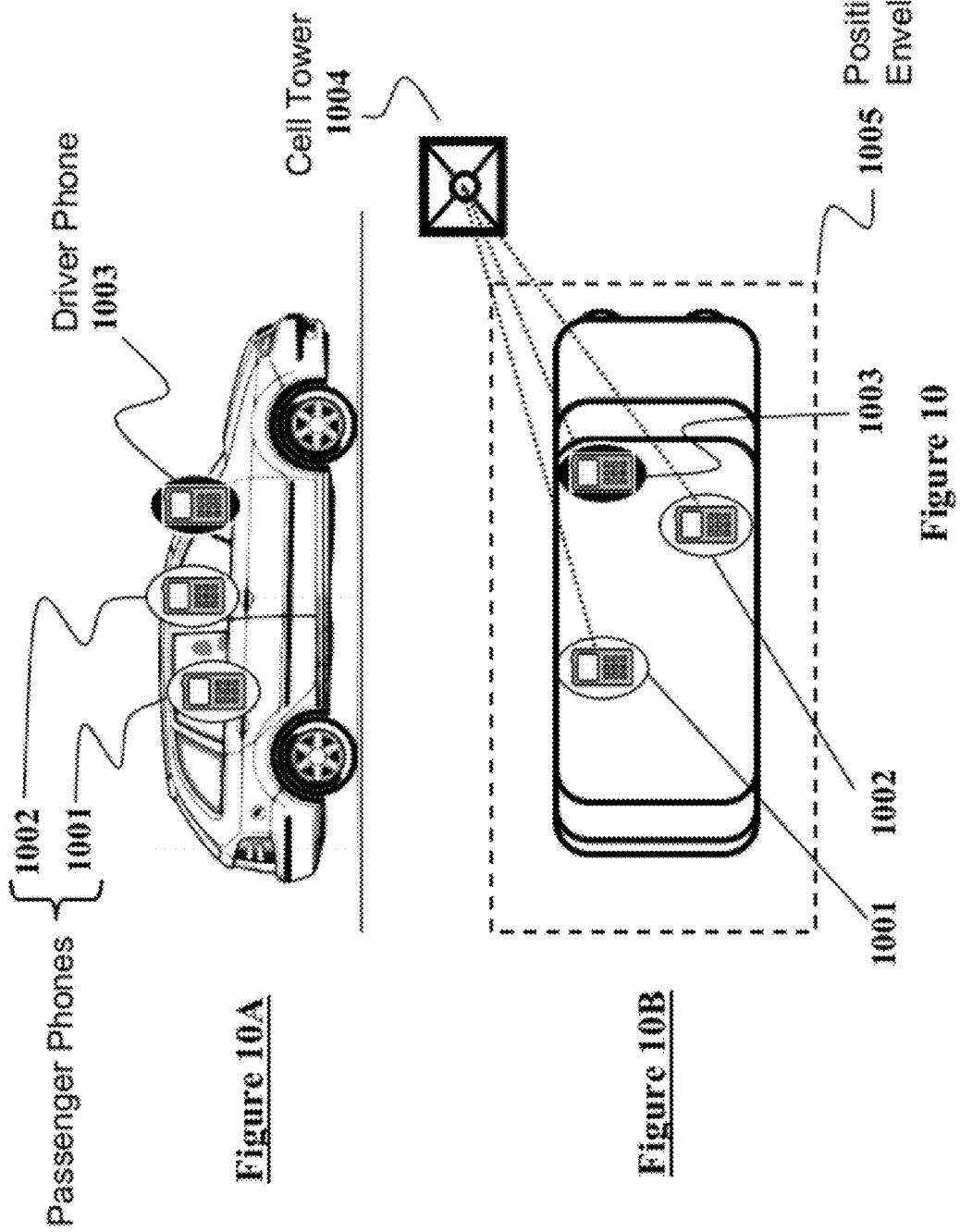
FIG. 10 shows multiple cell phones traveling within the same vehicle where an envelope is established in order to track and warn drivers of probable texting while driving.

FIG. 10 shows multiple cell phones traveling within the same vehicle where an envelope is established in order to track and warn drivers of probable texting while driving. In FIG. 10A, passenger phones 1001 and 1002 are riding within the same envelope as is driver's phone 1003. The service provider for each of these phones determines the position, velocity and other parameters for the phone as well as whether the phone is being used for texting. However, since this tracking mechanism is passive, there is no master phone registration as described previously for embodiments focused on disabling texting. If all of the phones in the vehicle are serviced by the same service provider, then that service provider can determine that these phones are within the same envelope 1005, and also which are texting and not texting. If some phones are serviced by a first service provider by way of cell tower 1004 and others are serviced by different service providers, then coordination between service providers is required for this tracking and warning embodiment in a manner similar to that described for FIGS. 7, 8, and 9.

FIG. 11 shows a table describing some possible and exemplary status conditions for multiple cell phones traveling within the same vehicle envelope, and conditions under which some cell phone users would be warned of probable texting while driving. Columns 1101 and 1102 represent two cell phone users traveling in the same envelope where both are licensed drivers. For this embodiment, a database containing records of driver licensing is queried to determine for each cell phone user whether or not they are a licensed driver. Unlicensed drivers corresponding to columns 1103 and 1104 are assumed it to be not driving. They are allowed to text under any and all conditions, and are therefore not warned of a possible texting while driving condition. Licensed drivers are scrutinized and may be warned of probable texting while driving under certain conditions. According to action column 1105 in FIG. 11, if only one licensed driver has an active phone and that phone is used for texting while moving, that driver will be warned of the possible violation. If two licensed drivers within the envelope have their phones active and one is texting, it is indeterminate as to whether the individual texting is driving, and no warning is given. It is assumed for this scenario that because texting while driving is against the law that the passenger in the vehicle is far more likely to be the person texting. If two or more cell phones within the envelope are all active and all are being used for texting, it is assumed that the driver of the vehicle is texting and a warning is issued. For this scenario, it is not required that all phones be texting simultaneously, only that all have texted during the transit time for the vehicle. To minimize the possibility of distracting a driver, warnings are typically given after the fact through either email or regular mail or a message (text or automated voice) to their phone that is sent at a time when it is determined that the person is no longer in a moving vehicle. As mentioned earlier, if two or more cell phone users within the same envelope are serviced by more than one service provider, then coordination between service providers is required for this tracking and warning embodiment in a manner similar to that described for FIGS. 7, 8, and 9.

Speech-to-Text and Text-to-Speech

The presence of a conventional Speech-to-Text and Text-to-Speech function on a cell phone doesn't necessarily prevent the user from viewing texts on the phone's display or from creating a text manually. A solution that seeks to disable conventional texting for drivers must take this into account. To be comprehensive, for phones identified to belong to a current driver of a vehicle, a solution must require that all interaction between a user and their phone is performed via bi-directional voice communication, and that a user is never allowed to enter a text manually or view a text optically while driving. According to the invention, a phone user who wishes to use speech-text capability while driving would typically indicate this preference in advance. They could also indicate this desire once determined to be driving, preferably by a single button operation such as for instance a speed dial. As part of inventions described herein, a service provider may determine that a particular phone is likely to be in use by a driver of a vehicle. This can be performed by methods described herein for envelope determination and tracking, and can also be performed by other methods known in the art. That a particular phone is used by a driver and not a passenger in a moving vehicle can be accomplished by the voluntary registration method described herein, or by other methods known in the art. Once a particular phone has been determined to be in use by a driver of a vehicle, conventional texting for that phone is disabled by the service provider, and if desired by the individual and allowed by local laws, a speech-text capability may be activated and utilized.

Figure 12:
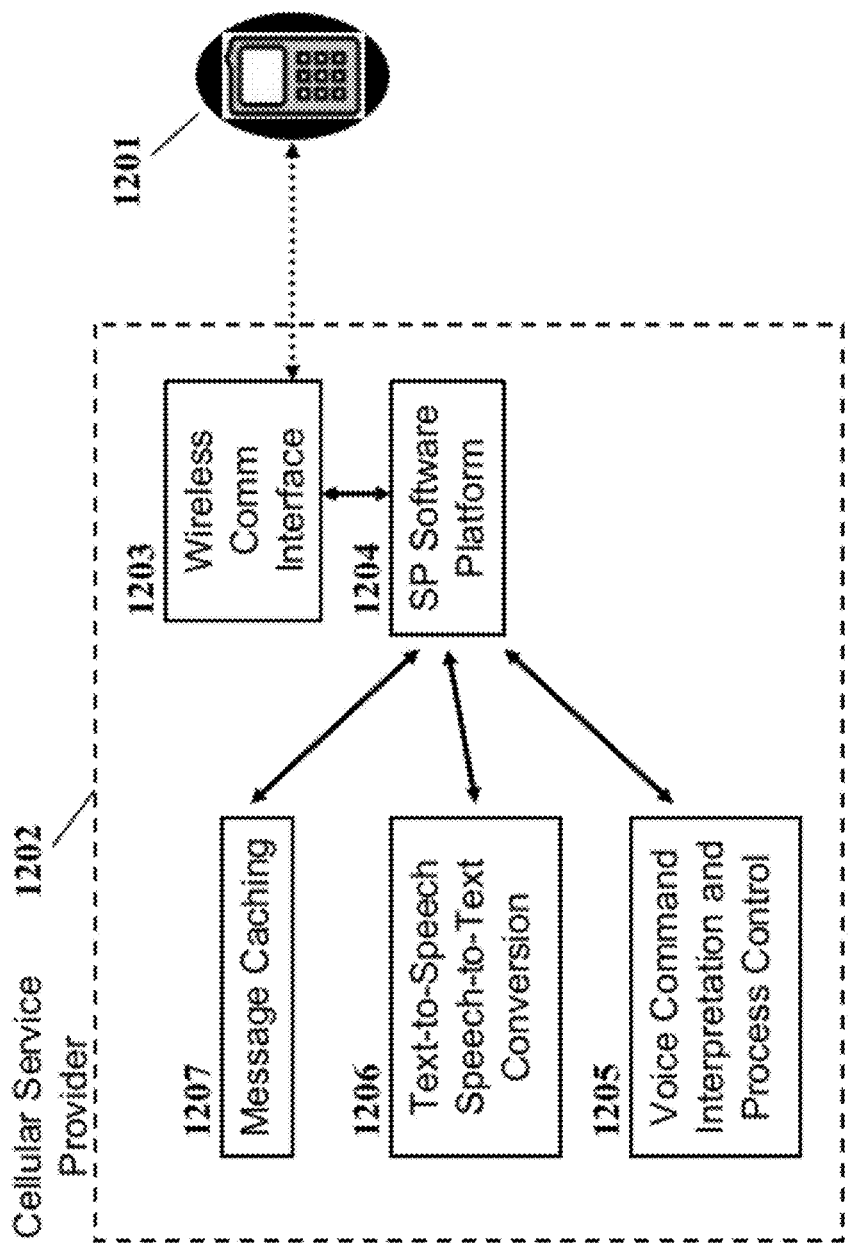
FIG. 12 shows a block diagram including functions at a cellular service provider for implementing a speech-text capability without any modifications or additions required of a user's cell phone.

If it is paramount to ensure that users can never circumvent speech-text capability while driving, the best solution is to have all speech-text functions performed at the service provider, requiring users to communicate solely by voice when dealing with text capability while driving. A representative and non-limiting infrastructure at a service provider 1202 for performing such functions is shown in FIG. 12. In general, a cellular service provider infrastructure may consist of any or all of central offices, base stations, cell towers, various backhauls and communication links, and the Internet, to name a few components. A user's phone 1201 interfaces with a conventional cellular service provider infrastructure 1202 via a wireless communication interface 1203 which in turn communicates with a software platform 1204 at the service provider. Functions shown in FIG. 12 as being performed at a cellular service provider may be performed at any location in the servicer provider's infrastructure. In the scenario of FIG. 12, a speech-to-text capability 1206 is performed at the service provider under control of voice command interpretation and process control functionality 1205. Since users accustomed to dealing with textual representations of their messages may wish to obtain text copies of voice conversions once their driving is complete, a message caching capability 1207 may also be included.

Figure 13:
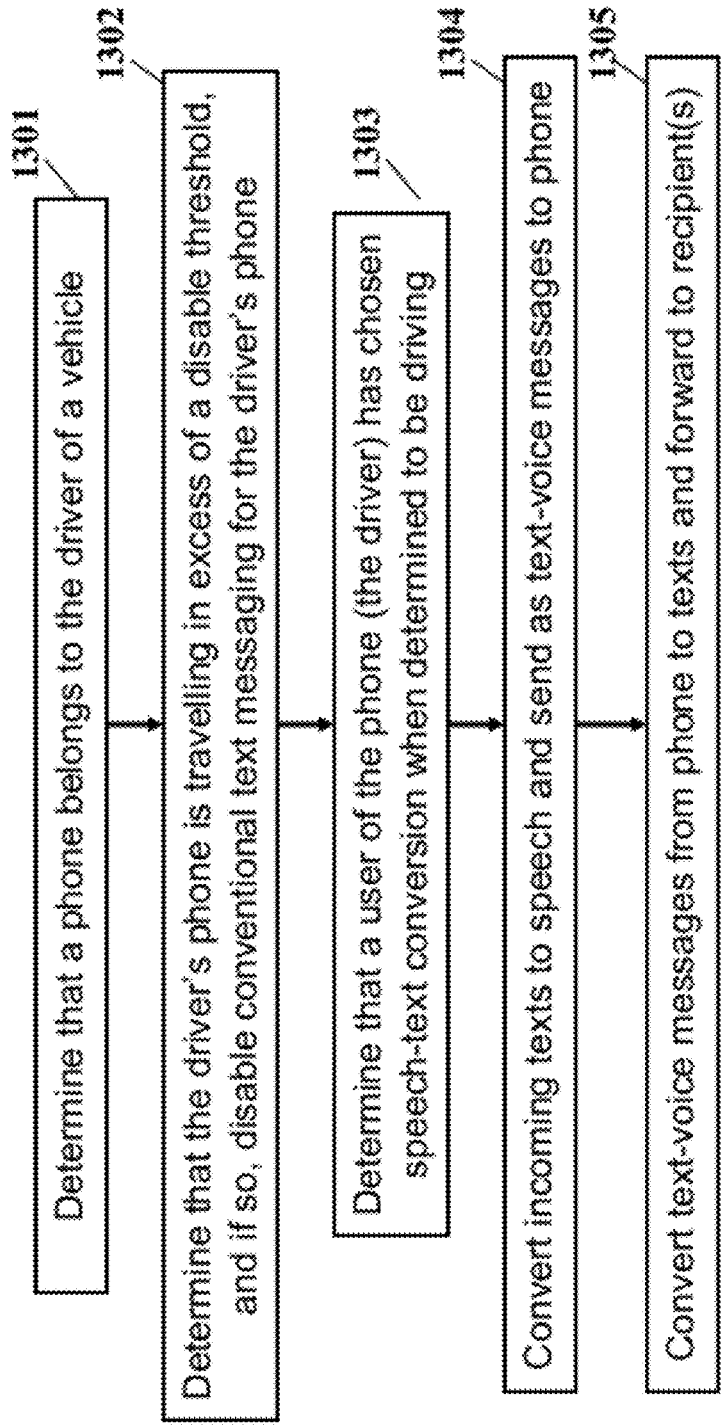
FIG. 13 shows a flow chart for operation of the system of FIG. 12.

FIG. 13 describes a process whereby speech-text conversion is performed at a service provider and all control of the process from a user's perspective is performed by way of bidirectional voice communication with the service provider. This includes menus provided by the service provider and commands issued by a user while determined to be driving. In step 1301, a service provider determines that a phone belongs to the driver of a vehicle. In step 1302, the service provider determines that the driver's phone is traveling in excess of a disable threshold, and if so, conventional text messaging for the phone is disabled. As described earlier herein, different criteria may be utilized to determine when conventional texting may be re-enabled, including that the phone has been traveling at a speed or velocity less than the disable threshold for a predetermined amount of time. In step 1303 it is determined that a user of the phone, already determined to be a driver, has chosen speech-text conversion when determined to be driving. In some embodiments this step may be optional. In step 1304 incoming texts intended for the driver's phone are converted at the service provider and sent as voice messages to the driver's phone. Such messages having a voice format yet conveying text information are hereinafter described as "text-voice" messages. Text-voice messages may be transferred by any means that include voice communication, including but not limited to any of: conventional phone calls; voice Instant Messages; or voicemail. In step 1305 text-voice messages from the driver's phone are converted to conventional text format and forwarded to one or more recipients. As mentioned with regard to FIG. 12, incoming and outgoing texts may be cached at the service provider in their conventional text message format, and forwarded to the driver's phone when it is determined by the service provider that the phone is no longer in a moving vehicle and conventional texting is restored. Such caching and forwarding functionality may be optional according to the stated preference of an individual phone user. Also, when a message is thus saved and later forwarded to a user's phone, it can be marked to the effect of having been "already sent" or "already received" so the user can keep track of those messages without confusion.

Figure 14:
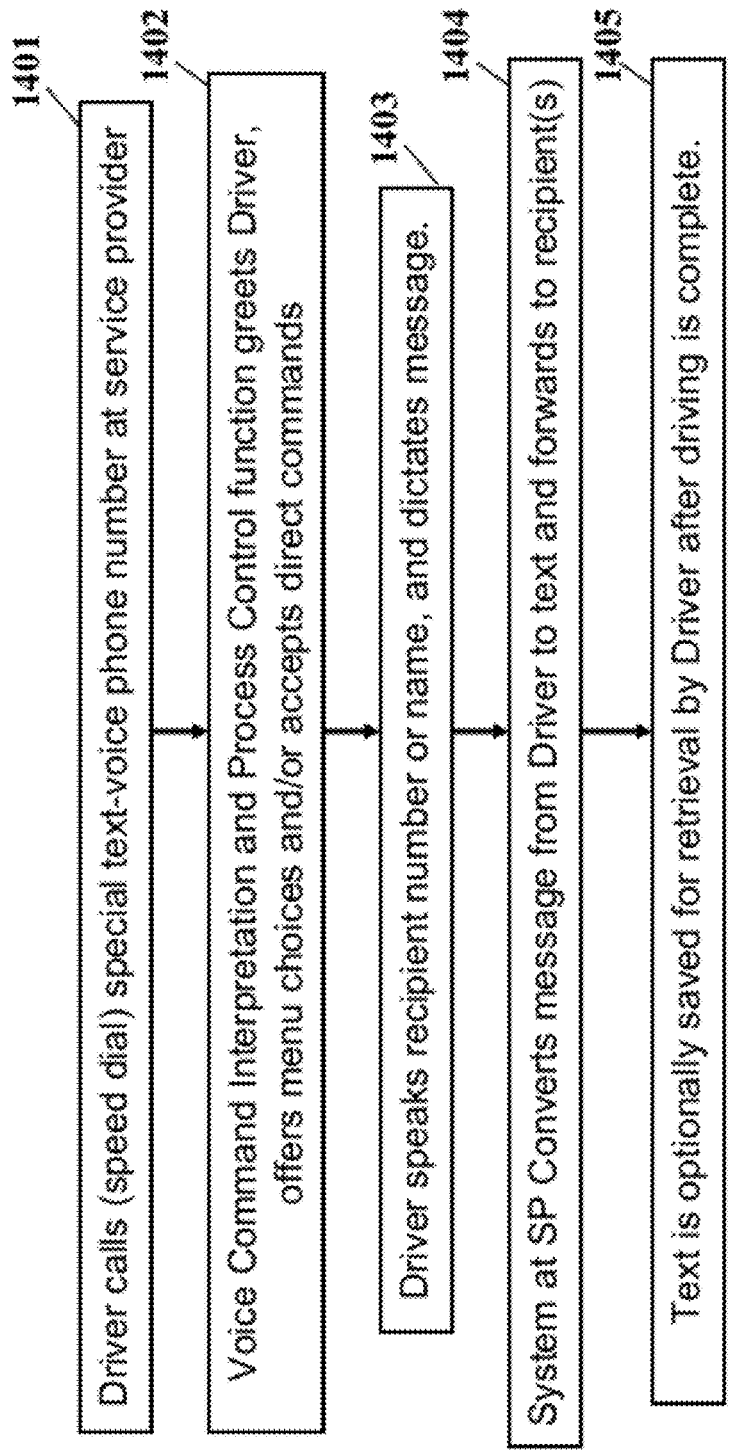
FIG. 14 shows a flow chart for operation of the system of FIG. 12, specifically for a phone user sending a text message solely by voice phone call communication with a service provider.

FIG. 14 shows a more detailed process description of how a driver would communicate via voice with a service provider in order to send and receive text-voice messages while determined to be driving. In step 1401 a driver places a conventional voice call to a service provider to initiate the process of sending or receiving text voice messages. In one embodiment this can be a speed dial number which a user can call with a single button push, with a call to this special number being allowed while driving. In step 1402 the service provider answers the call with a voice command interpretation functionality—typically including a menu capability with voice recognition—and proceeds to interact with the driver according to a process control function capability at the service provider. As part of this step a user may listen to messages converted from text, or dictate 1403 a message that they wish to be converted to a text. In step 1404 the system at the service provider converts a message dictated by the driver to a conventional text message and forwards to one or more recipients. In step 1405 the outgoing text message may be saved at the service provider for later retrieval by the driver after their driving is completed.

Other embodiments described herein include functions for voice command interpretation and process control of speech-text capability that are resident on a user's phone. In some embodiments the actual speech-text conversion may be performed on the user's phone while in other embodiments this conversion may be performed at the service provider. When the conversion is performed on the user's phone, text will be transferred back and forth between the service provider and the user's phone. When the conversion is performed at the service provider, text message information will be transferred back and forth in the form of a text-voice message. A "text-voice message" is a voice message that contains information originating from, or intended for, a conventional text message. Text-voice messages may be transferred by a conventional phone call, or alternative communication formats between a user's phone and a service provider including a voice Instant Massage (voice IM). A text-voice message may also include header information including source, destination, or other pertinent information. For the various embodiments described herein, a user may optionally choose to have incoming texts queued so that they can be listened to in sequence, thereby eliminating the need to scroll through a list on their phone whereby they would take their eyes off the road.

If software or firmware is present on a user's phone to control and/or convert as part of a speech-text capability and that software is modified or hacked, it may be possible for a user to circumvent the speech-text functionality and either enter or view texts in a conventional manner. As such, and according to the present invention, when software or firmware functionality exists on a user's phone to allow speech-text capability while driving, a validation function is also included to ensure that the software or firmware has not been modified, hacked, or circumvented in any way.

When any of voice command interpretation, process control for speech-text capability, and the actual speech-text conversion, are resident on a user's phone, the software applications that perform these functions should be initially certified and then validated from time to time as described herein. When such an application is added to a smart phone, other communication can be performed between the user's phone and the service provider including sending codes to either enable or disable speech-text related functions.

Figure 15:
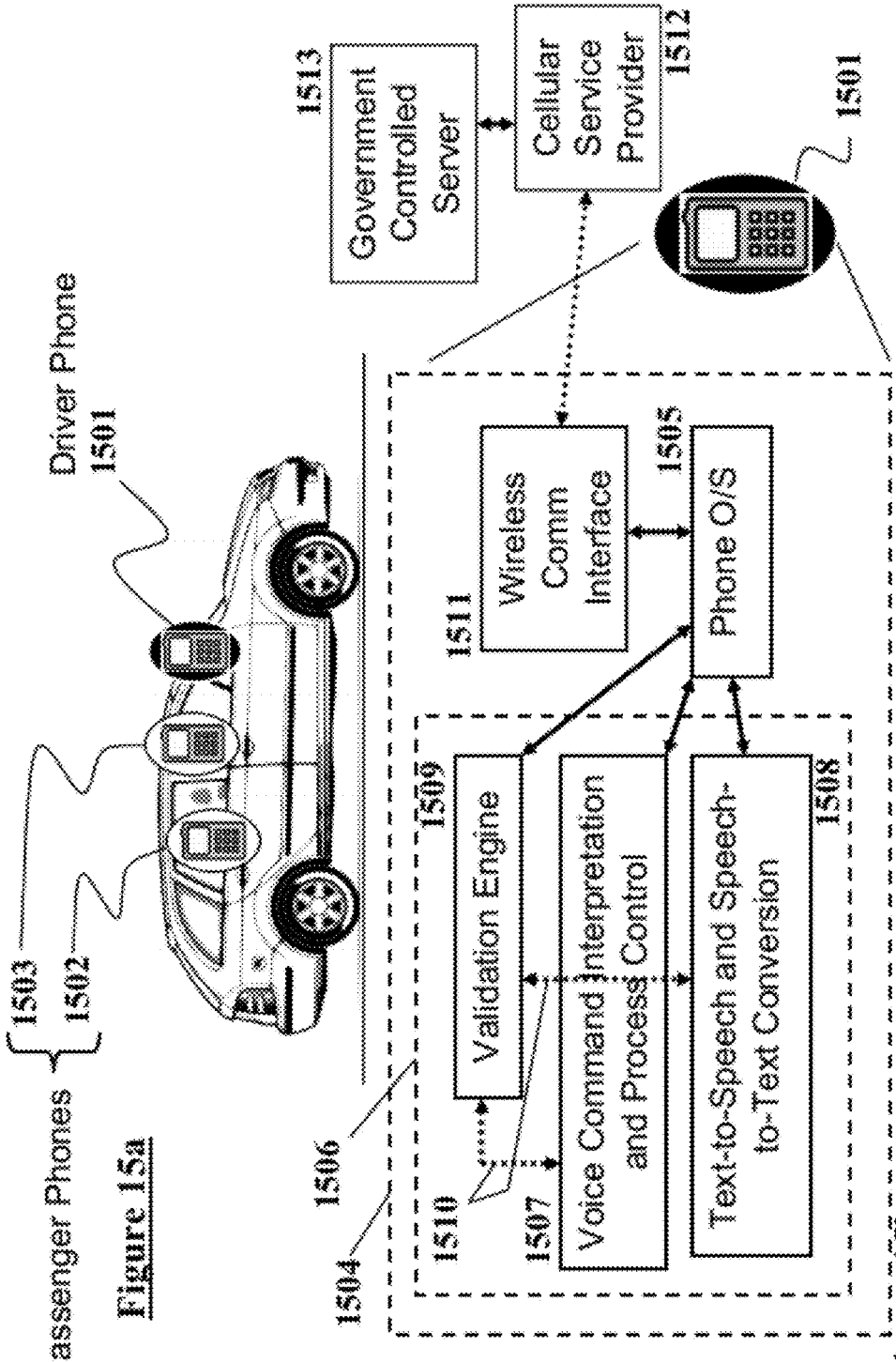
FIG. 15 shows a block diagram including functions within a user's phone for implementing a speech-text capability, including validation of software.

FIG. 15 shows a scenario where speech-text conversion is performed on a user's phone. FIG. 15a shows a driver's phone 1501 as well as passenger's phones 1502 and 1503. As described elsewhere herein and as known in the art for alternative solutions, a service provider may determine that phone 1501 should be disabled for conventional texting due to its use by a driver, while conventional texting is allowed for phones 1502 and 1503 belonging to passengers. In FIG. 15b, functionalities 1504 within phone 1501 are shown including operating system 1505 which communicates with and controls functions for voice command interpretation and process control 1507 as well as text-to-speech and speech-to-text conversion 1508, both of which are viewed as subsystem 1506 which is protected against tampering by a validation engine function 1509. Validation engine 1509 may be a separate hardware engine, or alternately a software module which executes on a processor within the phone. If executed on a processor this may be the same processor that executes the phone's operating system 1505 or may be a separate processor. Validation engine 1509 may access software or firmware for functions 1507 and 1508 via O/S 1505, or alternately may access functions 1507 and 1508 directly by means of access path 1510 which may either be a hardware path with separate bus structures or a software path using bus structures shared with other functions. Regardless of the specific implementation, the validation engine must be able to ensure from time to time that no tampering has occurred with either the voice command interpretation and process control function 1507 or speech-text conversion functionality 1508. This validation may include various encryption techniques known in the art or other validation techniques known in the art. From time to time validation functionality in phone 1501 may communicate through wireless communication interface 1511 with cellular service provider 1512 to ensure that all speech-text related functionality in phone 1501 is valid. The process of validation may also utilize communication with a government controlled server 1513 which may supply validation-related software updates or encryption-related updates. Alternately, cellular service provider 1512 may supply such updates. In the embodiment of FIG. 15, since speech-text conversion is performed on the user's phone, text message information being communicated between the user's phone and the service provider would be in a voice format and therefore is considered a text-voice message. Although not shown in FIG. 15, text messages may be cached at the service provider or on the user's phone for later viewing after driving is completed. If cached on the user's phone, these would be encrypted or otherwise hidden from a user while driving so that conventional text viewing is unavailable while driving.

Figure 16:
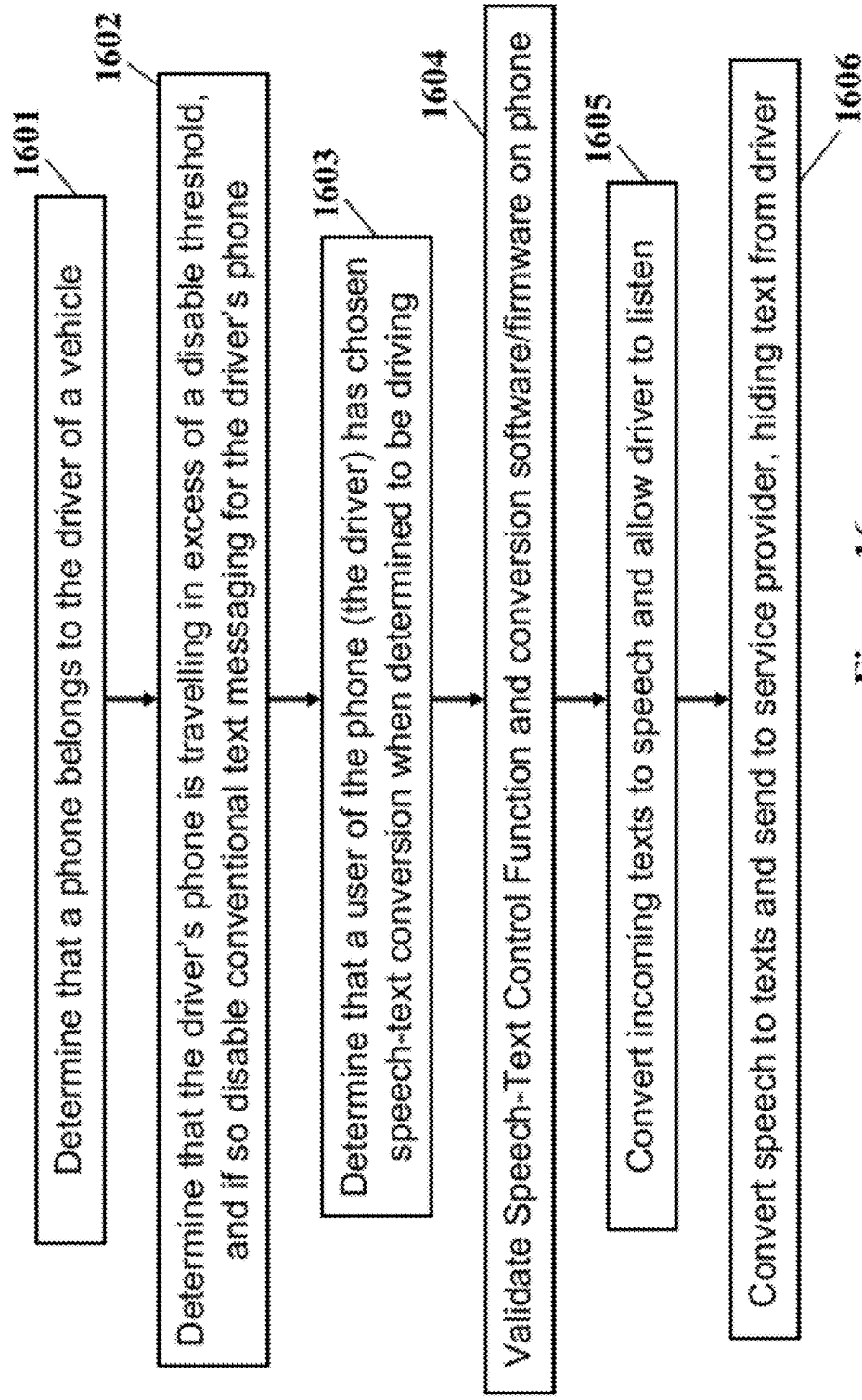
FIG. 16 shows a flow chart for operation of the system of FIG. 15 where speech-text conversion is performed on a user's phone, including functions within a user's phone for validation of software on the phone for control and speech-text conversion.

FIG. 16 shows a process for operation of the functions of FIG. 15. In step 1601 it is determined that a phone belongs to the driver of the vehicle. In step 1602 it is determined that the driver's phone is traveling in excess of a disable threshold, and if so conventional text messaging is disabled for the phone. In step 1603 it is optionally determined that a user of the phone has chosen speech-text conversion when determined to be driving. In step 1604 the speech text control function as well as the conversion software/firmware on the phone are validated to ensure that no tampering or alteration has been performed that might allow circumvention of the speech-text functionality. In step 1605 incoming texts are converted to speech and the driver is allowed to listen to voice information representing a text. Since information transferred between a service provider and a user's phone in the scenario of FIGS. 15 and 16 is still in text format, such information may be encrypted in order to better ensure the integrity of the speech-text functionality. In step 1606 a user dictates information intended for texting, conversion functionality 1508 creates text information from the dictated voice information, while at the same time any textual representations of incoming or outgoing texts are hidden from the user of the phone (the driver) until they are determined to be no longer driving.

Figure 17:
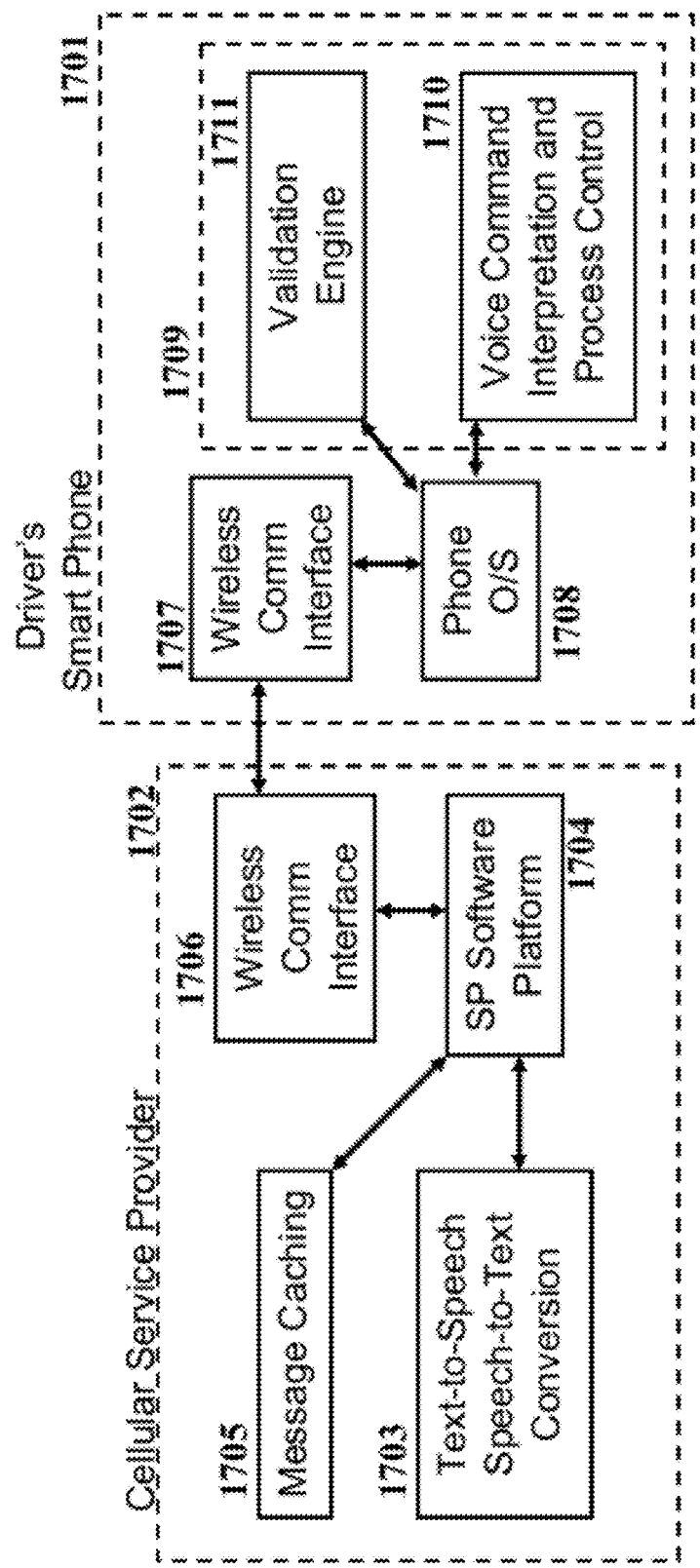
FIG. 17 shows a block diagram including functions within a user's phone and within a service provider infrastructure for implementing a speech-text capability, including validation of software on a user's phone.

An alternative embodiment is shown in FIG. 17 where voice interpretation command and control is performed on a driver's phone, but actual speech-text conversion is performed at the service provider. Here, text message information being communicated between the user's phone and the service provider are in a text message format which in one exemplary embodiment may be encrypted. The embodiments of FIGS. 15 and 17 may provide some additional element of convenience to a user. However, due to the presence of speech-text related software on the user's phone, additional provisions are required to ensure that users cannot circumvent the intended capabilities and somehow perform conventional text entry or viewing while driving. In FIG. 17 a user's phone 1701 communicates with cellular service provider 1702. Speech-text conversion 1703 is performed at the service provider along with optional message caching 1705 in case a user wishes to view text-voice messages as conventional texts when no longer driving. Conversion 1703 at the service provider is controlled by the service provider software platform 1704 which communicates through a wireless communication interface 1706 with wireless communication interface 1707 on a user's phone 1701. The phone's O/S 1708 then communicates with a voice command interpretation and process control functionality 1710 which allows the user to operate a speech-text capability while driving. Since function 1710, if altered or tampered with, might allow conventional texting while driving, it is shown closely coupled in module 1709 with validation engine 1711 which as described earlier may perform validation of various software and firmware modules either directly or via the phone O/S 1708.

Figure 18:
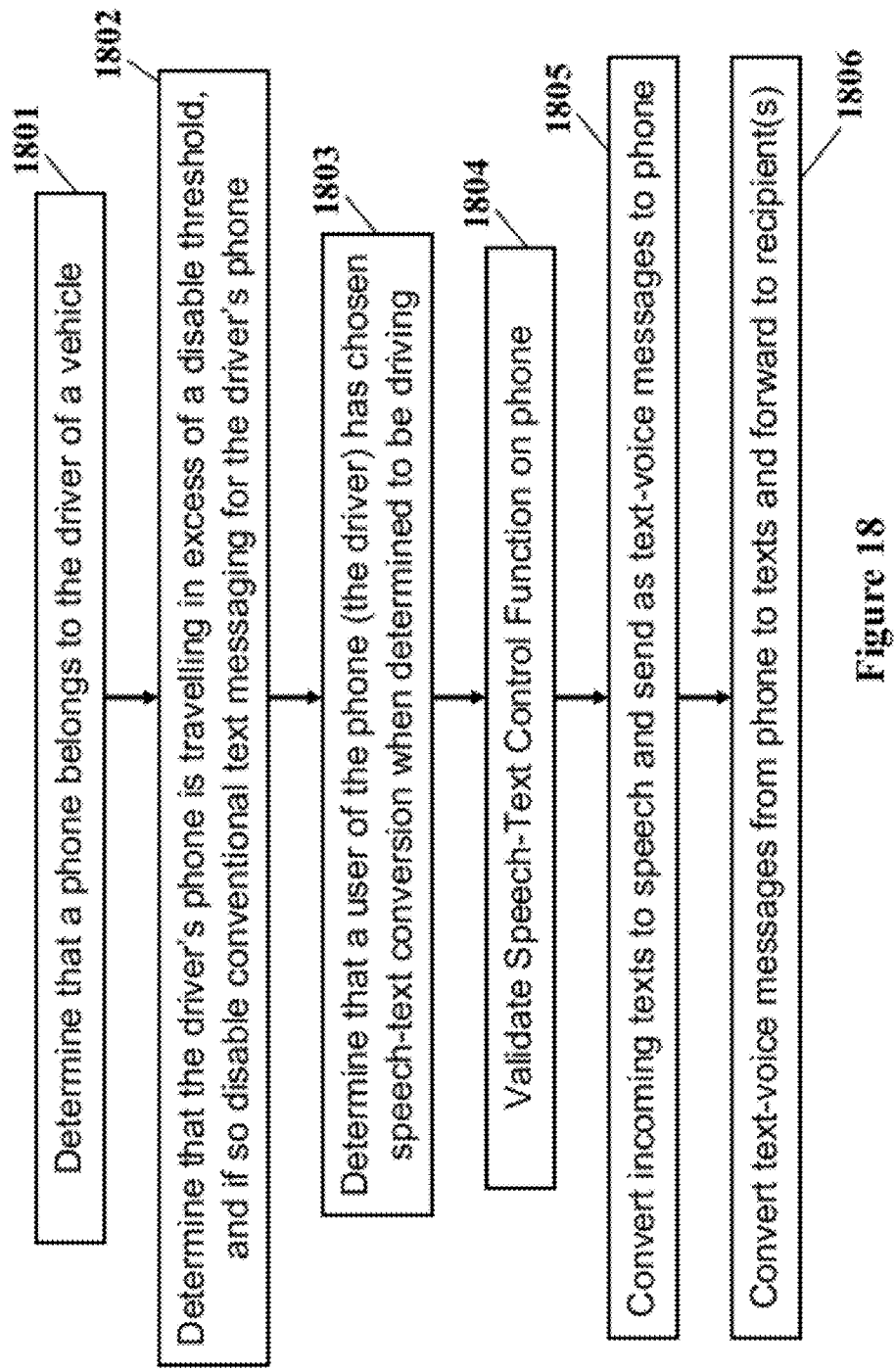
FIG. 18 shows a flow chart for operation of the system of FIG. 17 where speech-text conversion is performed at the service provider, including functions within a user's phone for validation of control software on the phone.

FIG. 18 describes a process for operation of the functionality described in FIG. 17. In step 1801 it is determined that a phone belongs to the driver of a vehicle. In step 1802 it is determined that the driver's phone is traveling in excess of a disable threshold, and if so conventional text messaging for the driver's phone is disabled. In step 1803 it is optionally determined that a user of the phone has previously chosen speech-text conversion while driving. In step 1804 the speech-text control function on the phone is validated to ensure it has not been hacked or tampered with in any way. In step 1805 incoming texts are converted to speech at the service provider and sent as text-voice messages to the driver's phone. And in step 1806 text-voice messages from the driver's phone are converted at the service provider to conventional text messages and are forwarded to one or more recipients.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, it will be apparent to one skilled in the art that the embodiments described and claimed herein, while directed to preventing texting while driving, may also be used with minor modification to also prevent voice communication while driving. Such minor modifications would include, for instance, a shortening of the re-enable period.

Also for example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A method performed by a cellular service provider for safe texting while driving utilizing text-voice conversion, comprising:

determining that a user of a phone is a current driver of a vehicle;

wherein the service provider determines that a user of a phone is a current driver of a vehicle in response to the user registering the phone as a master phone, wherein said registering is initiated by the current driver;

determining that the user's phone is travelling at a velocity in excess of a disable threshold;

disabling conventional text messaging for the phone;

converting an incoming text message from a third party to voice and sending as a voice message to the phone; and processing a voice message from the user that the user intends to be sent as an outgoing text message according to a method comprising:

receiving the voice message from the phone;

converting the voice message from the phone to a text message; and forwarding the outgoing text message to a third party.

2. The method of claim 1 wherein a voice message transmitted from the phone to the service provider is transferred as a conventional phone call.

3. The method of claim 2 wherein the conventional phone call is answered at the service provider with a voice menu prompting the phone user to submit header and message information by voice.

4. The method of claim 1 wherein a voice message transmitted from the phone to the service provider is transferred as a voice Instant Message.

5. The method of claim 1 wherein incoming texts are saved at the service provider for later review by the user, and are forwarded to the phone when conventional texting is no longer disabled for the phone.

6. The method of claim 1 wherein outgoing texts are saved at the service provider for later review by the user, and are forwarded to the phone when conventional texting is no longer disabled for the phone.

7. The method of claim 1 wherein the user of the phone is determined to be a driver of the vehicle by the user having registered the phone as a master phone.

8. The method of claim 1 wherein before enabling text-voice message capability for a phone whose user has been determined to be driving, it is determined that a state, province, or country where the phone is located allows voice communication while driving.

9. A cell phone including an application for safe texting, comprising:

one or more processors;

a software or firmware operating system;

memory;

a software or firmware application for safe texting comprising instructions residing on a non-transitory storage medium within the phone;

wherein when the application for safe texting is activated conventional texting is disabled, and wherein text messages are both generated and received by a driver of a vehicle solely using voice input and output of the phone while travelling at a velocity in excess of a disable threshold;

a validation engine to validate the application for safe texting; and wherein the application for safe texting is enabled when:

it has been determined that the cell phone is being used by the driver of a vehicle;

wherein the service provider determines that a user of a phone is a current driver of a vehicle in response to the user registering the phone as a master phone, wherein said registering is initiated by the current driver;

it has been determined that the vehicle is travelling at the velocity in excess of the disable threshold; and it has been determined by the validation engine that the application for safe texting has not been modified or circumvented.

10. The cell phone of claim 9 wherein disabling conventional text messaging for the phone includes disabling viewing of texts while conventional text messaging is disabled.

11. The cell phone of claim 9 wherein the application for safe texting includes voice-text conversion, and when the application for safe texting is enabled, text message information transferred between the phone and a service provider is text information.

12. The cell phone of claim 11 wherein text messages sent and received while conventional texting is disabled are hidden from viewing by a user until conventional texting has been re-enabled.

13. The cell phone of claim 9 wherein the application for safe texting does not include voice-text conversion, and when the application for safe texting is enabled, text message information transferred between the phone and a service provider is voice information with voice-text conversion being performed at the service provider.

14. The cell phone of claim 13 wherein text messages sent and received while conventional texting is disabled are forwarded from the service provider to the cell phone when conventional texting has been re-enabled.

15. A cellular service provider system for safe texting while driving utilizing voice-text conversion, comprising:

a conventional service provider hardware and software infrastructure;

a software application for safe texting operating within the hardware and software infrastructure wherein the software application comprises instructions residing in a non-transient storage medium; and wherein the service provider determines that a user of a phone is a current driver of a vehicle in response to the user registering the phone as a master phone, wherein said registering is initiated by the current driver;

wherein the service provider determines that the user's phone is travelling at a velocity in excess of a disable threshold;

wherein the service provider prevents conventional text messages from being transmitted to or from the phone;

wherein the service provider converts incoming text messages to voice messages and sends the voice messages to the phone; and wherein the service provider processes voice messages from the user that the user intends to be sent as outgoing text messages according to a method comprising:

receiving the voice messages from the phone;

converting the voice messages from the phone to text messages; and forwarding the text messages to one or more third parties.

16. The method of claim 15 wherein a voice message thus transmitted from the phone to the service provider is transferred by way of a conventional phone call.

17. The method of claim 15 wherein a voice message thus transmitted from the service provider to the phone is transferred by way of a conventional phone call.

18. The method of claim 15 wherein incoming texts are saved at the service provider for later review by the user, and are forwarded to the phone when conventional texting is no longer disabled for the phone.

19. The method of claim 15 wherein outgoing texts are saved at the service provider for later review by the user, and are forwarded to the phone when conventional texting is no longer disabled for the phone.

20. The method of claim 15 wherein before enabling voice-text message capability for a phone whose user has been determined to be driving, it is determined that a state, province, or country where the phone is located allows voice communication while driving.

* * * * *